(12) United States Patent
Masaki et al.

(10) Patent No.: US 6,844,697 B2
(45) Date of Patent: Jan. 18, 2005

(54) MOTOR CONTROLLER

(75) Inventors: Ryoso Masaki, Hitachi (JP); Satoru Kaneko, Urizura (JP); Yoshimi Sakurai, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 143 days.

(21) Appl. No.: 10/084,387

(22) Filed: Feb. 28, 2002

(65) Prior Publication Data
US 2003/0020428 A1 Jan. 30, 2003

(30) Foreign Application Priority Data
Jul. 24, 2001 (JP) ........................................ 2001-222807

(51) Int. Cl.[7] .................................................. H02P 6/18
(52) U.S. Cl. ........................ 318/721; 318/254; 318/722
(58) Field of Search ................................ 318/138, 254, 318/439, 700, 720, 721, 722, 723, 724

(56) References Cited

U.S. PATENT DOCUMENTS

| | | | | |
|---|---|---|---|---|
| 4,764,711 A | * | 8/1988 | Deller | 318/619 |
| 4,791,343 A | * | 12/1988 | Ahrendt | 318/696 |
| 5,270,622 A | * | 12/1993 | Krause | 318/254 |
| 5,903,129 A | | 5/1999 | Okuno et al. | |

FOREIGN PATENT DOCUMENTS

| | | |
|---|---|---|
| EP | 0 856 937 A2 | 8/1998 |
| EP | 1 107 448 A2 | 6/2001 |
| JP | 07-245981 | 9/1995 |
| JP | 08-205578 | 8/1996 |
| JP | 11-069884 | 3/1999 |
| JP | 11-150983 | 6/1999 |

* cited by examiner

*Primary Examiner*—Bentsu Ro
(74) *Attorney, Agent, or Firm*—Crowell & Moring LLP

(57) ABSTRACT

In order to propose an inexpensive and highly precise motor controller, it is structured so as to detect the position of the rotor on the basis of the difference between the real current differential vector and the reference current differential vector, thereby control the motor without using a rotation position sensor.

19 Claims, 19 Drawing Sheets

MOTOR CONTROLLER

BACKGROUND OF THE INVENTION

The present invention relates to a motor controller.

To control the speed and torque of a synchronous motor, it is necessary to detect or infer the pole position. By executing current control or voltage control on the basis of the detected pole position, the speed and torque of a synchronous motor can be controlled.

In recent years, a pole position sensorless control system for controlling a synchronous motor without detecting the pole position of the synchronous motor by a position sensor is proposed.

For example, the first control method described in Japanese Application Patent Laid-Open Publication No. Hei 07-245981 and Electric Society, Industry Application Department, National Convention No. 170 in the 8th years of Heisei is a method for applying an alternating voltage and inferring the pole position on the basis of the parallel component and orthogonal component (current component in the rotatory coordinate system) of the motor current for the voltage and the position of the magnetic pole can be detected without using a pole position sensor during stopping or at a low speed.

Further, the second method for superimposing an additional voltage described in Japanese Application Patent Laid-Open Publication No. Hei 11-150983 and Japanese Application Patent Laid-Open Publication No. Hei 11-69884 is a method for realizing no-use of a pole position sensor within the range from low load to high load during stopping or at a low speed by adding an applied voltage so as to prevent magnetic saturation even in the high torque region.

Further, the third control method described in Japanese Application Patent Laid-Open Publication No. Hei 08-205578 is a method for detecting the saliency of a synchronous motor from the mutual relation between the vector of a voltage applied to the synchronous motor by the pulse width control (PWM control) and the ripple component (current difference vector) of the motor current for it. The third method uses a general PWM signal for controlling the voltage of the synchronous motor, so that there is an advantage that there is no need to load an additional signal for detection.

Further, the voltage vector means a voltage having the magnitude and direction decided from a three-phase voltage or d-axis and q-axis voltages. The same may be said with the current vector and hereinafter, each phase voltage as an element or the d-axis and q-axis voltages and the voltage vector as a sum total will be explained appropriately. Further, for the synchronous motor, the pole position of the rotor is to be detected, so that the pole position will be explained hereunder. For a reluctance motor, the specific position of a rotor having saliency is detected.

Further, a control method for detecting the pole position of a rotor in the same way as with the aforementioned method on the basis of the difference in inductance between the q axis and the q axis using the magnetic saturation characteristic of an induction motor is proposed.

Therefore, when the aforementioned is to be described together, the pole position and the specific position of the reluctance motor will be referred to as a rotor position.

SUMMARY OF THE INVENTION

In the first control method mentioned above, to detect the pole position by driving the motor, it is necessary to extract a current having the same frequency component as that of the detection alternating voltage by a band pass filter such as a notch filter and Fourier integration. Particularly, when the number of revolutions of the motor is increased, the separation between the input frequency of the motor and the frequency of the detection alternating voltage is difficult and a problem arises that stable driving control at high speed rotation is difficult. Further, it is necessary to consider so as to prevent effect by the switching characteristic of the invertor. Namely, the carrier-frequency of the PWM signal is several kHz to 20 kHz, while the frequency of the detection alternating voltage is low such as several hundreds Hz, so that during driving control for the motor, noise of several hundreds Hz may be generated.

Further, the second control method mentioned above is intended to improve the characteristics for drive-controlling the motor in a stop state or a low-speed rotation state, and the relation between the current detection timing which is important for drive-controlling the motor at high-speed rotation and the PWM signal is not taken into account, and highly accurate position detection is not taken into account.

Further, the third control method mentioned above requires, to realize it, to detect the mutual relation between the condition of the motor current and the applied voltage every changing of the PWM signal. Namely, for one period of the carrier, it is necessary to detect the motor current condition at least 6 times and confirm the applied voltage condition, so that a problem arises that a highly precise controller must be used.

An object of the present invention is to propose an inexpensive and highly precise motor controller.

Another object of the present invention is to propose a motor controller for controlling an AC motor with high precision by suppressing an increase in motor loss within the wide range from stop state to high-speed rotation state using one current detector.

Still another object of the present invention is to propose a motor controller for detecting the rotor position of an AC motor without applying a detection voltage to the AC motor.

The present invention has an AC motor, a power converter for applying a voltage to the AC motor by a PWM signal generated by comparing a command value with a carrier, and a controller for detecting the rotor position of the AC motor and controlling the command value and is characterized in that the position of the rotor is detected on the basis of the difference between the real current differential vector and the reference current differential vector.

DETAILED DESCRIPTION OF THE PREFERRED EMBODIMENTS

The first embodiment of the present invention will be explained with reference to FIG. 1. The embodiment is structured so as to control a synchronous motor having so-called reverse saliency that the d-axis inductance Ld is smaller than the q-axis inductance Lq without using a position sensor.

Figure 1:
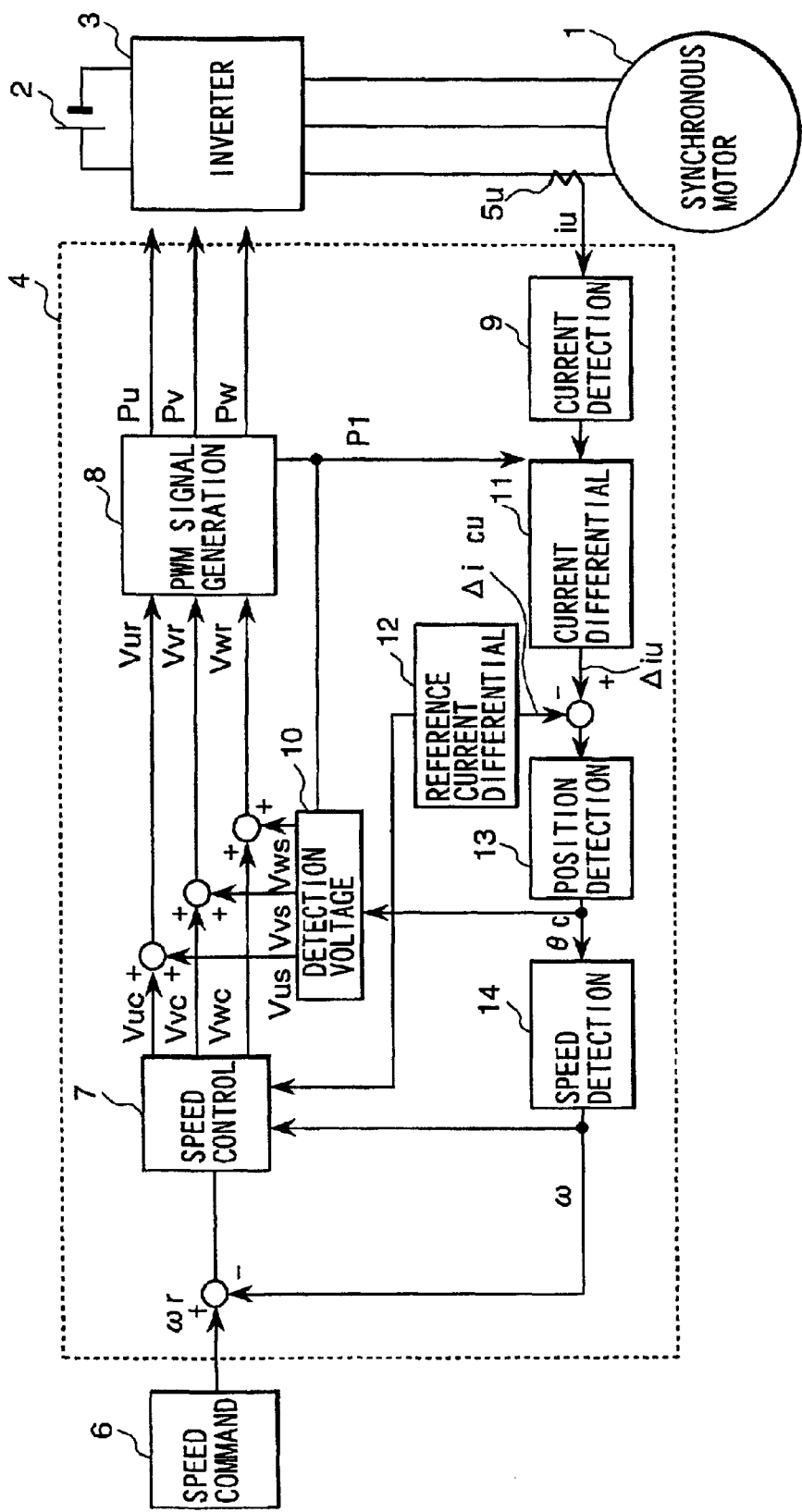
FIG. 1 is a block diagram of a motor control system of the first embodiment of the present invention.

FIG. 1 is a block diagram of a motor control system for driving a synchronous motor 1 which is the first embodiment by the DC energy of a battery 2.

The DC voltage of the battery 2 is converted to a three-phase AC voltage by an inverter 3 which is a power converter and applied to the synchronous motor 1 which is an AC motor. The applied voltage is decided by performing the following calculation by a controller 4 which is a controller composed of a microcomputer.

The controller 4 calculates the difference of the speed command value ωr input from a speed command generation unit 6 from the detected motor speed ω and performs speed control calculations at a speed controller 7 on the basis of the difference. The speed controller 7 outputs control voltages Vuc, Vvc, and Vwc of each phase on the basis of the speed control calculation results. The controller 4 adds detection voltages Vus, Vvs, and Vws of each phase, which will be described later, respectively to these control voltages Vuc, Vvc, and Vwc, generates voltage command values Vur, Vvr, and Vwr of each phase, and inputs them to a PWM signal generation unit 8.

The PWM signal generation unit 8 generates PWM signals Pu, Pv, and Pw of each phase corresponding to the voltage command values Vur, Vvr, and Vwr of each phase and supplies them to the inverter 3 and the inverter 3 generates output voltages corresponding to the PWM signals Pu, Pv, and Pw and applies them to the synchronous motor 1.

FIG. 2 shows the relation between the voltage command values Vur, Vvr, and Vwr of each phase and the PWM signals Pu, Pv, and Pw. The PWM signal generation unit 8 compares the carrier of triangular waveform and the voltage command values Vur, Vvr, and Vwr, thereby generates the PWM signals Pu, Pv, and Pw.

The PWM signal generation unit 8 internally fetches and sets the voltage command values Vur, Vvr, and Vwr of each phase at the point of time (times t1, t3, t5, . . . ) when the carrier takes the maximum value, compares them with the carrier, and generates the PWM signals Pu, Pv, and Pw.

Figure 2A:
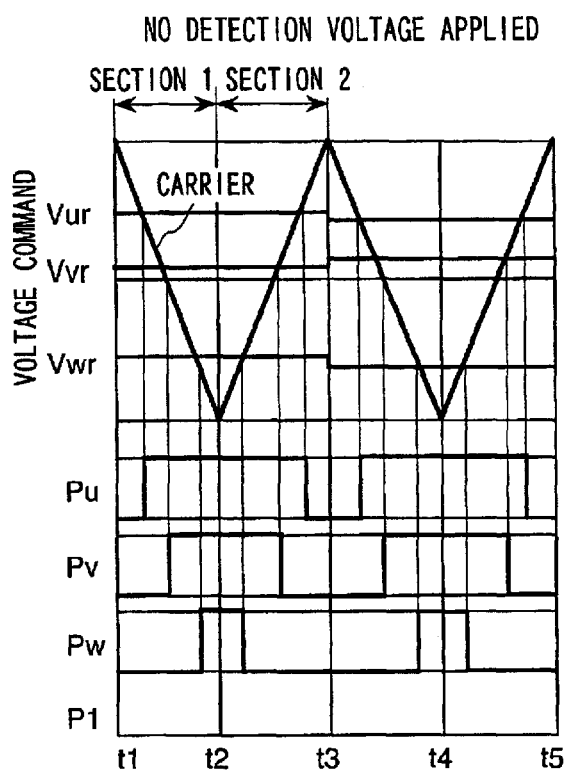
FIGS. 2(a) and 2(b) are a time chart showing the relation between the voltage of each phase, PWM signal, and carrier synchronizing signal when the detection voltage in the first embodiment shown in FIG. 1 is applied.

The waveform when the voltage command values Vur, Vvr and Vwr (=the control voltages Vuc, Vvc, and Vwc) to which the detection voltages Vus, Vvs, and Vws are not added are fetched is as shown in FIG. 2(a).

Figure 2B:
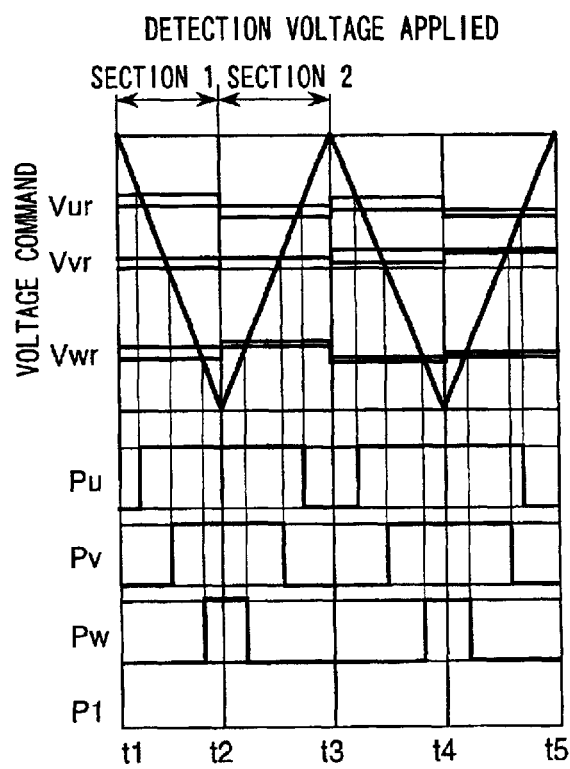

On the other hand, when the detection voltages Vus, Vvs, and Vws are added (applied to the synchronous motor 1), the PWM signal generation unit 8 sets the positive and negative detection voltages Vus, Vvs, and Vws every a half period (times t1, t2, t3, . . . ) of the carrier so as to obtain the waveform shown in FIG. 2(b). Namely, in the section 1 shown in FIG. 2(b), the PWM signal generation unit 8 adds (applies) the detection voltages Vus, Vvs, and Vws so as to set the detection voltage vector in the detection voltage direction θv which will be described later. Further, in the section 2 shown in FIG. 2(b), the PWM signal generation unit 8 adds the detection voltages Vus, Vvs, and Vws so as to apply the detection voltage vector in the opposite direction (in the direction different by 180 degrees) to the detection voltage direction.

Figure 3:
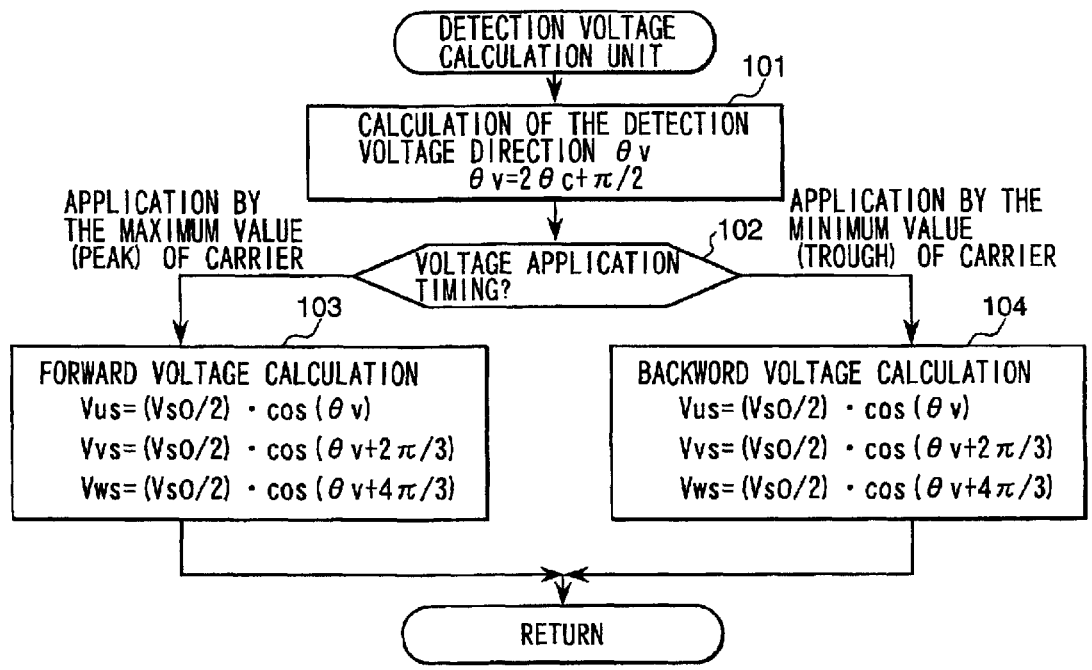
FIG. 3 is a low chart of the process executed by the detection calculation unit in the first embodiment shown in FIG. 1.

FIG. 3 is a flow chart showing the process to be executed by a detection voltage calculation unit 10 to realize it.

Step 101

The detection voltage direction θv is obtained by calculation of 2θc/2. The reason for the voltage direction will be described later by referring to FIGS. 5 to 7.

Step 102

The voltage application timing is judged and the process is branched. Namely, as shown in FIG. 2, when the times t1, t3, . . . are judged as a point of time when the carrier reaches the maximum value, the process is branched to Step 103 and when the times t2, t4, ... are judged as a point of time when the carrier reaches the minimum value, the process is branched to Step 104.

Step 103

To set the vector Vs of detection voltage applied to the synchronous motor 1 in the section 1 in the detection voltage direction θv (positive direction), the detection voltages Vus, Vvs, and Vws of each phase are calculated.

Step 104

To set the vector Vs of detection voltage applied to the synchronous motor 1 in the section 2 in the detection voltage direction θv (negative direction, that is, direction of θv+π), the detection voltages Vus, Vvs, and Vws of each phase are calculated.

In FIG. 3, Vs0 for deciding the magnitude of the detection voltage vector Vs is set to ½, thus the voltage of each phase is decided. The reason is that the voltage difference between the sections 1 and 2 is defined a real detection voltage vector Vs. Further, it is desirable to set Vs0 to a small value as far as possible as long as the variation of current can be detected. Further, in this case, on the basis of the α axis of the α-β static coordinate system having the orthogonal α axis ands axis, the phase or direction is decided and the U phase is set on the α axis. Therefore, the directions of the V and W phases are directions of 2π/3 and 4π/3 to the α axis respectively.

Next, the detection method for the rotor position in the first embodiment shown in FIG. 1 will be explained.

As a current sensor 5u for detecting the U-phase current of the synchronous motor 1, an inexpensive current transformer CT for detecting only the AC component of a current flowing in the U phase is used. By doing this, only the pulsating component of a current by the PWM signal is detected.

A current detection unit 9 of the controller 4 fetches and detects a U-phase current iu output from the current transformer CT in the timing coinciding with a carrier synchronous signal P1 synchronized with the maximum value and minimum value of the carrier.

A current differential calculation unit 11 obtains the variation of the U-phase current iu from the detection voltage vector, that is, the U-phase current difference Δiu as shown below. The current differential calculation unit 11 calculates the current difference Δiu1 in the section 1 shown in FIG. 2 from the difference between the U-phase current iu1 fetched by the current detection unit 9 at the point of time of the maximum value of the carrier (for example, time t1) and the U-phase current iu2 fetched at the point of time of the next minimum value of the carrier (time t2). Further, the current differential calculation unit 11 calculates the current difference Δiu2 in the section 2 shown in FIG. 2 from the difference between the U-phase current iu2 and the U-phase current iu3 fetched at the point of time of the next maximum value of the carrier (time t3). The current differences Δiu1 and Δiu2 are affected by the control voltages Vuc, Vvc, and Vwc, the detection voltage vector, and the counter electromotive force of the synchronous motor 1. However, in consideration of the difference between the current differences Δiu1 and Δiu2, when the applied voltage and counter electromotive force are the same, their effects are canceled.

Therefore, as explained by referring to FIG. 2, in the sections 1 and 2, when the control voltages Vuc, Vvc, and Vwc are applied in the same value and only the detection voltage vectors Vs are applied in different values, the U-phase current difference Δiu which is the difference between the current differences Δiu1 and Δiu2 is affected only by the difference in the detection voltage vector Vs between the sections 1 and 2. Namely, the variation of the U-phase current iu to the detection voltage vector Vs and the U-phase current difference Δiu can be detected quite independently of the control voltages Vuc, Vvc, and Vwc. Hereinafter, the difference in the detection voltage vector between the sections 1 and 2 is called a detection voltage vector Vs.

Figure 4:
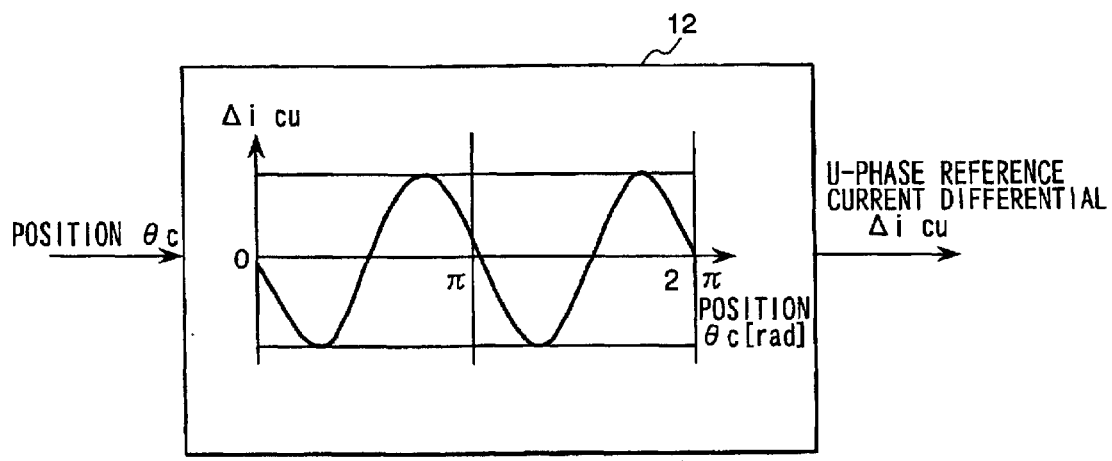
FIG. 4 is a block diagram showing the relation between input and output of the reference current differential calculation unit in the first embodiment shown in FIG. 1.

Meanwhile, when the rotor position θ and the d-axis and q-axis inductances of the synchronous motor 1 are known, the variation of the U-phase current iu to the detection voltage vector Vs can be obtained by calculation. This value is assumed as a U-phase reference current difference Δicu. Actually, instead of the rotor position θ, the inferred rotor position θc calculated by the controller 4 is known, so that assuming that the inferred rotor position θc agrees with the rotor position θ, the U-phase reference current difference Δicu is obtained by a reference current differential calculation unit 12. In this process, as shown in FIG. 4, when a table is prepared for the inferred rotor position θc, the U-phase reference current difference Δicu can be obtained simply. This obtaining method will be described later together with the vector diagrams of FIGS. 5 to 7.

The difference between the detected U-phase current difference Δiu and the U-phase reference current difference Δicu (hereinafter, this is called a U-phase detection current difference Δisu) indicates a variation (difference) between the inferred rotor position θc and the rotor position θ, so that a position detection unit 13 controls converging by using a control means such as proportion-integration calculations so as to set the difference to 0.

It is an important point of the present invention to make the relation thereof clear and it will be described later by referring to the vector diagrams of FIGS. 5 to 7.

The inferred rotor position θc obtained as mentioned above is input to a speed detection unit 14 and used to obtain the motor speed from the variation thereof. Further, the inferred rotor position θc is input to the speed control unit 7 and also used to output the control voltage vector obtained by the speed control unit 7 to the control voltages Vuc, Vvc, and Vwc of each phase by coordinate conversion.

Next, the detection of the rotor position θ in the motor control system shown in FIG. 1 will be explained by referring to FIG. 5.

Figure 5:
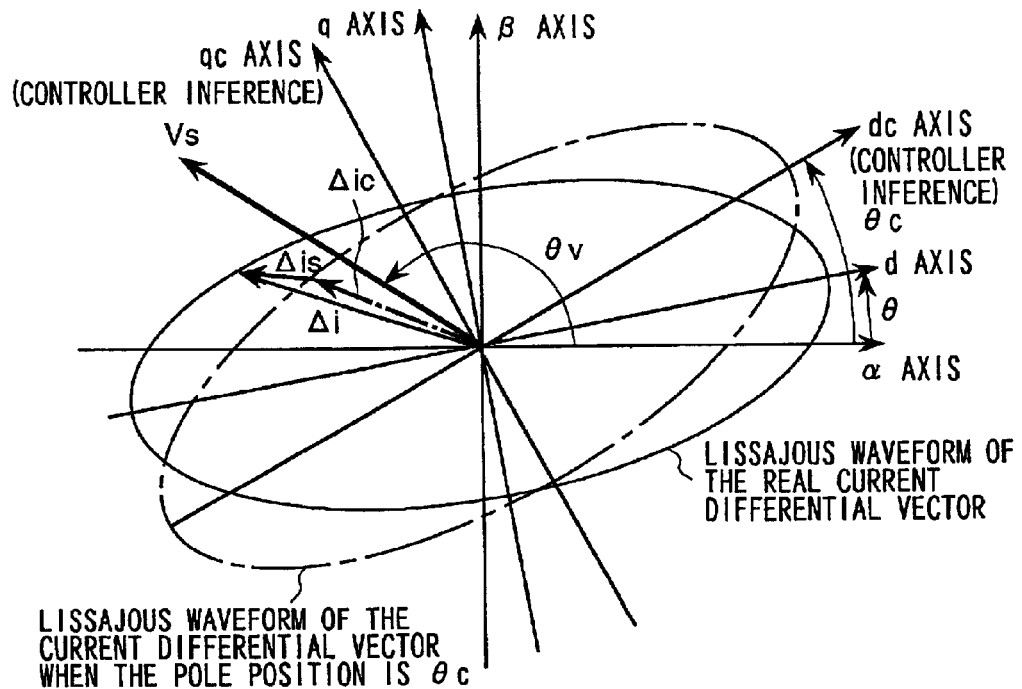
FIG. 5 is a vector diagram showing the condition of the detection voltage vector and current differential vector in the first embodiment shown in FIG. 1.

FIG. 5 shows a state that the d-q axis rotatory coordinate system that the pole position is on the d axis rotates from the α axis by the rotor position θ and the inferred rotor position θc of the controller 4 is larger than the real rotor position θ and different from the real rotor position θ. The ellipse indicated by a solid line that the d axis is a long axis and the q axis is a short axis indicates a Lissajous waveform of the current differential vector Δi to the detection voltage vector Vs when the detection voltage vector Vs makes one revolution from 0 to 2π. Therefore, when the inductances of the d axis and q axis of the synchronous motor 1 are the set values, the actually-generated current differential vector Δi to the detection voltage vector Vs moves on the solid-line ellipse. On the other hand, when the inductances of the d axis and q axis of the synchronous motor 1 are as set and the rotor position of the synchronous motor 1 coincides with the inferred rotor position θc inferred by the controller 4, the current differential vector Δi moves on the ellipse indicated by a dashed line that the dc axis is a long axis and the qc axis is a short axis. This is called a reference current differential vector Δic.

In this state, as shown in FIG. 5, the change condition of current when the detection voltage vector Vs is applied in the detection voltage direction θv, that is, in the direction of 2θc+π/2 will be explained.

When the detection voltage vector Vs is applied in the phase θv direction, the current differential vector Δi actually generated, as shown in FIG. 5, is a vector on the Lissajous waveform line indicated by a solid line and expressed by the following formula.

$$\Delta i = \Delta i\alpha + j\Delta i\beta \quad \text{(Formula 1)}$$

where j means an imaginary axis and Δiα and Δis mean the following formulas.

$$\Delta i\alpha = \Delta ids \cdot \cos\theta - \Delta iqs \cdot \sin\theta \quad \text{(Formula 2)}$$

$$\Delta is = \Delta ids \cdot \sin\theta + \Delta iqs \cdot \cos\theta \quad \text{(Formula 3)}$$

$$\Delta ids = Vs0 \cdot \cos(\theta v - \theta)\Delta t/Ld \quad \text{(Formula 4)}$$

$$\Delta iqs = Vs0 \cdot \sin(\theta v - \theta)\Delta t/Ld \quad \text{(Formula 5)}$$

where Ld and Lq indicate the inductances of the d axis and q axis of the synchronous motor 1 respectively and Vs0 indicates the magnitude of the detection voltage (length of the detection voltage vector Vs shown in FIG. 5). Therefore, Formula 2 and Formula 3 are expressed as follows.

$$\Delta i\alpha = (\tfrac{1}{2}) \cdot Vs0 \cdot \Delta t\{(1/Ld+1/Lq)\cos\theta v + (1/Ld-1/Lq)\cos(\theta v-2\theta)\} \quad \text{(Formula 6)}$$

$$\Delta is = (\tfrac{1}{2}) \cdot Vs0 \cdot \Delta t\{(1/Ld+1/Lq)\sin\theta v - (1/Ld-1/Lq)\sin(\theta v-2\theta)\} \quad \text{(Formula 7)}$$

In the same way, when the real rotor position coincides with the inferred rotor position θc inferred by the controller 4, the reference current differential vector Δic generated by applying the detection voltage vector Vs in the phase θv direction is on the Lissajous waveform indicated by a dashed line. In FIG. 5, the detection voltage vector Vs is closer to the qc axis than the q axis, so that the reference current differential vector Δic is a vector closer to the detection voltage vector Vs than the current differential vector Δi and expressed by the following formula.

$$\Delta ic = \Delta i\alpha c + j\Delta i\beta c \quad \text{(Formula 8)}$$

where Δiαc and Δiβc mean the following formulas.

$$\Delta i\alpha c = \Delta idsc \cdot \cos\theta c - \Delta iqsc \cdot \sin\theta c \quad \text{(Formula 9)}$$

$$\Delta i\beta c = \Delta idsc \cdot \sin\theta c + \Delta iqsc \cdot \cos\theta c \quad \text{(Formula 10)}$$

$$\Delta idsc = Vs0 \cdot \cos(\theta v - \theta c)\Delta t/Ldc \quad \text{(Formula 11)}$$

$$\Delta iqsc = Vs0 \cdot \sin(\theta v - \theta c)\Delta t/Ldc \quad \text{(Formula 12)}$$

where Ldc and Lqc indicate the inductances of the reference d axis and q axis of the synchronous motor 1 set by the controller 4. Therefore, Formula 9 and Formula 10 are expressed as follows.

$$\Delta i\alpha c = (\tfrac{1}{2}) \cdot Vs0 \cdot \Delta t\{(1/Ldc+1/Lqc)\cos\theta v + (1/Ldc-1/Lqc)\cos(\theta v-2\theta c)\} \quad \text{(Formula 13)}$$

$$\Delta isc = (\tfrac{1}{2}) \cdot Vs0 \cdot \Delta t\{(1/Ldc+1/Lqc)\sin\theta v - (1/Ldc-1/Lqc)\sin(\theta v-2\theta c)\} \quad \text{(Formula 14)}$$

In this case, the U-phase reference current difference Δicu shown in FIG. 4 is the U-phase contribution of Δiαc and a value proportional to Δiαc, so that a table can be prepared by calculation including the detection voltage direction θv. Further, the detection voltage direction θv is set to a value of (2θc+π/2), though it will be described later. Therefore, Formula 3 is expressed as follows, so that a table for obtaining the U-phase reference current difference Δicu is prepared on the basis of Formula 15.

$$\Delta i\alpha c = (\tfrac{1}{2}) \cdot Vs0 \cdot \Delta t(1/Ldc+1/Lqc)\cos(2\theta c+\pi/2) \quad \text{(Formula 15)}$$

Next, the difference between the current differential vector Δi and the reference current differential vector Δic and the detection current differential vector Δis will be examined. Further, the inductances Ldc and Lqc of the reference d axis and q axis of the synchronous motor 1 are respectively different from the inductances Ld and Lq of the real d axis and q axis and a method taking it into account may be used together. However, in this case, Ldc=Ld and Lqc=Lq are assumed to be held.

The following may be obtained using Formula 1 to Formula 4.

$$\Delta is = \Delta i - \Delta ic = \Delta i\alpha s + j\Delta iss \quad \text{(Formula 16)}$$

where Δiαs and Δiss are given the following formulas.

$$\Delta i\alpha s = (\tfrac{1}{2}) \cdot Vs0 \cdot \Delta t(1/Ld-1/Lq)\{\cos(\theta v-2\theta) - \cos(\theta v-2\theta c)\} \quad \text{(Formula 17)}$$

$$\Delta isc = (\tfrac{1}{2}) \cdot Vs0 \cdot \Delta t(1/Ld-1/Lq)\{\sin(\theta v-2\theta) - \sin(\theta v-2\theta c)\} \quad \text{(Formula 18)}$$

Then, when (2θc+π/2) is substituted for the detection voltage direction θv, Formula 17 and Formula 18 can be expanded as shown below. Further, $(\tfrac{1}{2}) \cdot Vs0 \cdot \Delta t(1/Ld-1/Lq)$ is assumed as a constant of K0.

$$\begin{aligned}\Delta i\alpha s &= K0\{\cos(\theta v-2\theta) - \cos(\theta v-2\theta c)\} \\ &= K0\{\cos(2\theta c-2\theta+\pi/2) - \cos(\pi/2)\} \\ &= -K0 \cdot \sin2(\theta c-\theta) \\ &= -K0 \cdot \sin2(\theta-\theta c)\end{aligned} \quad \text{(Formula 19)}$$

$$\begin{aligned}\Delta i\beta s &= -K0\{\sin(\theta v-2\theta) - \sin(\theta v-2\theta c)\} \\ &= -K0\ K0\{\sin(2\theta c-2\theta+\pi/2) - \sin(\pi/2)\} \\ &= K0 \cdot \{1 - \cos2(\theta c-\theta)\}\end{aligned} \quad \text{(Formula 20)}$$

The vector expressed by Formula 19 and Formula 20 is the detection current differential vector Δis. Therefore, as shown in FIG. 5, when the inferred rotor position θc is larger than the real rotor position θ, if the detection voltage vector Vs is applied assuming that the detection voltage direction θv is (2θc+π/2), the detection current differential vector Δis is a vector in the direction close to the negative direction of the α axis. Particularly, in consideration of Formula 19, when the detection voltage vector Vs is applied assuming that the detection voltage direction θv is (2θc+π/2), the α axis component Δiαs of the detection current differential vector Δis is a value proportional to sin 2(θ-θc). Therefore, when the α axis component Δiαs is set to 0, the inferred rotor position θc can coincide with the real rotor position θ. Further, in this embodiment, the U phase of the synchronous motor 1 coincides with the α axis, the α axis component Δiαs of the detection current differential vector Δis is proportional to the U-phase detection current differential vector Δisu. Therefore, in FIG. 5, the U-phase detection current differential vector Δisu is negative and it means that the inferred rotor position θc is larger than the real rotor position θ, so that by performing control calculations so as to reduce the inferred rotor position θc, the inferred rotor position θc can be brought close to the real rotor position θ. Such calculations are performed by the position detection unit 13.

Figure 6:
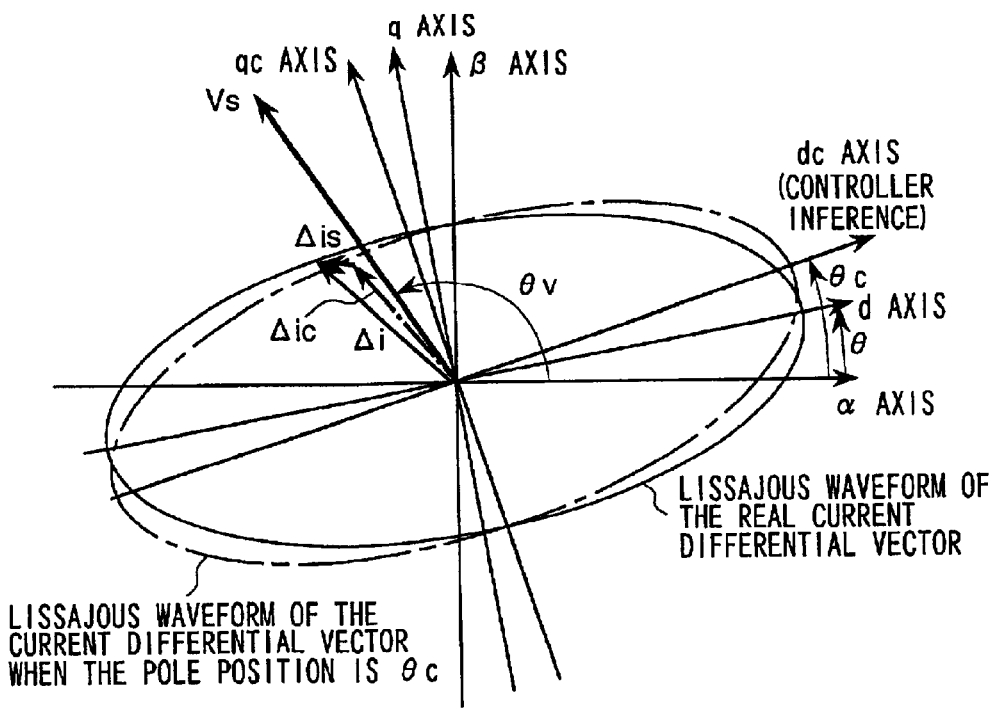
FIG. 6 is a vector diagram showing the condition of the detection voltage vector and current differential vector in the first embodiment shown in FIG. 1.

FIG. 6 shows the relation between the detection voltage vector Vs and the current differential vectors Δi, Δic, and Δis for it when the inferred rotor position θc is close to the real rotor position θ in this way. Since the inferred rotor position θc is made smaller, it is found that the direction θv of the detection voltage vector Vs is smaller than that shown in FIG. 5. Therefore, the current differential vector Δi and the reference current differential vector Δic respectively move in the different directions from those shown in FIG. 5, while the detection current differential vector Δis is directed almost in the negative direction of the α axis and the magnitude thereof is made smaller. Therefore, it is found that the inferred rotor position θc is close to the real rotor position θ. On the basis of the U-phase detection current differential vector Δisu proportional to the α axis component thereof, the inferred rotor position θc can coincide with the real rotor position θ by control calculation.

Figure 7:
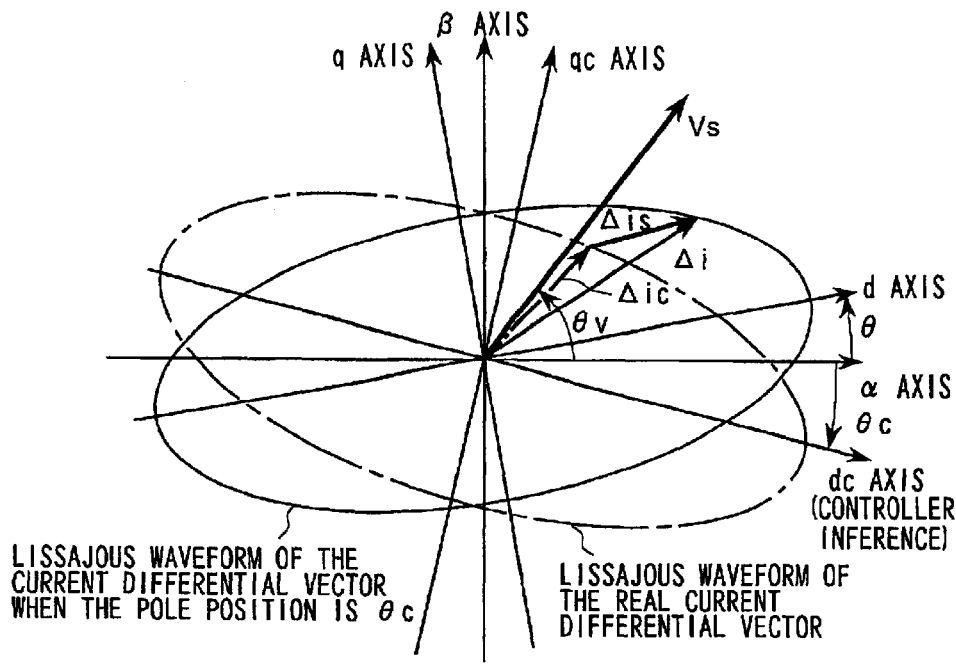
FIG. 7 is a vector diagram showing the condition of the detection voltage vector and current differential vector in the first embodiment shown in FIG. 1.

When the inferred rotor position θc is small for the real rotor position θ as shown in FIG. 7, the detection current differential vector Δis is directed close to the positive direction of the α axis, so that the inferred rotor position θc can coincide with the real rotor position θ by control calculation in the same way. These relations can be derived from Formula 19 and Formula 20.

In this embodiment, the rotor position can be inferred precisely using one inexpensive current sensor, so that compared with a conventional controller using a plurality of current sensors, an inexpensive position sensorless controller can be realized. Moreover, the inference can be executed by a calculation process on the basis of a one-phase current, so that the controller 4 can be realized using an inexpensive microprocessor.

Further, the current sensor 5u may detect only the pulsating component of a current on the basis of the PWM signal, so that a signal having a frequency component in the neighborhood of the carrier frequency is input to the current detection unit 9, thus the resolution of current detection can be improved. By doing this, the magnitude of the detection voltage vector Vs can be reduced and there is an advantage that the effect by addition of the detection voltage can be reduced greatly.

Figure 8:
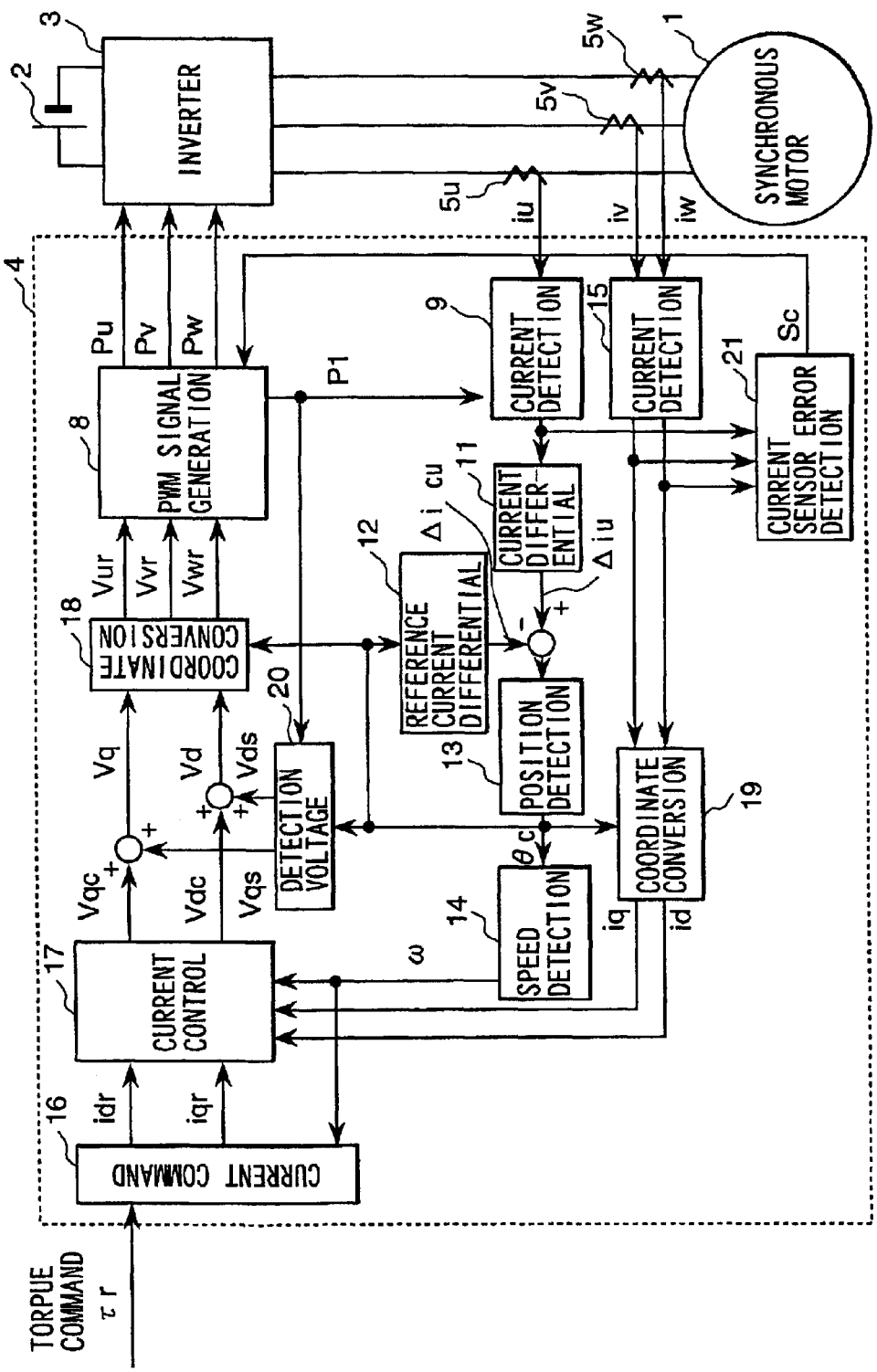
FIG. 8 is a block diagram of a motor control system showing the second embodiment of the present invention.

FIG. 8 is a block diagram of a motor control system showing the second embodiment of the present invention. In this embodiment, as compared with the first embodiment, the method for applying the detection voltage vector Vs is different in a point that two current sensors 5v and 5w are used for current control for a torque command instead of a speed command. The method for inferring the rotor position using one current sensor 5u is the same as that of the first embodiment, so that duplicate explanation will be omitted.

This embodiment is suitable for motor control of an electric car for generating torque proportional to a torque command τr according to the stepping depth of an accelerator pedal.

When the torque command τr is input to the current command unit 16, the current command unit 16 calculates ad-axis current command value idr for controlling the magnetic flux of the synchronous motor 1 and a q-axis current command value idq orthogonal to it on the basis of the torque command Tr and the motor speed ω. The calculation may be performed so as to obtain from a table prepared by calculating the d-axis current command value idr and the q-axis current command value idq orthogonal to it beforehand so as to minimize the loss of the driving system of the synchronous motor 1 for the torque command τr and the motor speed ω. The d-axis current command value idr and the q-axis current command value idq obtained here are input to the current control unit 17.

Further, a V-phase current iv and a W-phase current iw which are detected by the current sensors 5v and 5w are converted from analogue to digital by the current detection unit 15 and fetched inside the controller 4 as a digital amount. Thereafter, by the coordinate conversion unit 19, these currents are coordinate-converted from the static coordinate system to the d–q axis rotatory coordinate system rotating in the same way as with the rotor using the inferred rotor position θc obtained by the position detection unit 13 and a d-axis current id and a q-axis current id are obtained.

The d-axis current id and the q-axis current id are input to the current control unit 17, and the feedback control calculation by the difference between the d-axis current command value idr and the d-axis current id is performed by the current control unit 17, thus a d-axis control voltage Vdc is decided, and the feedback control calculation by the difference between the q-axis current command value iqr and the q-axis current iq is performed, thus a q-axis control voltage Vqc is decided. The control calculation is generally the proportion-integration calculation. Further, as a method for correcting the counter electromotive force accompanying rotation of the synchronous motor 1, non-interference control according to the motor speed ω may be used together.

From the viewpoint of control, when the detection voltages Vqs and Vds are ignored, the d-axis voltage command value Vdr (=d-axis control voltage Vdc) and the q-axis voltage command value Vqr (=q-axis control voltage Vqdc) are converted from the d–q axis rotatory coordinate system to the α–β axis static coordinate system by the coordinate conversion unit 18 and 3-phase voltage commands Vur, Vvr, and Vwr are output. By this addition of the current control system, the d-axis current id can coincide with the d-axis current command value idr and the q-axis current id can coincide with the d-axis current command value idr respectively at a rapid response speed.

In the second embodiment, the position sensorless control system can realize rapid-response torque control.

Further, the detection voltage calculation unit 20 in the second embodiment is structured so as to apply the detection voltages Vds and Vqs in the d–q axis coordinate system. The processing method executed by the detection voltage calculation unit 20 will be explained by referring to FIG. 9.

Figure 9:
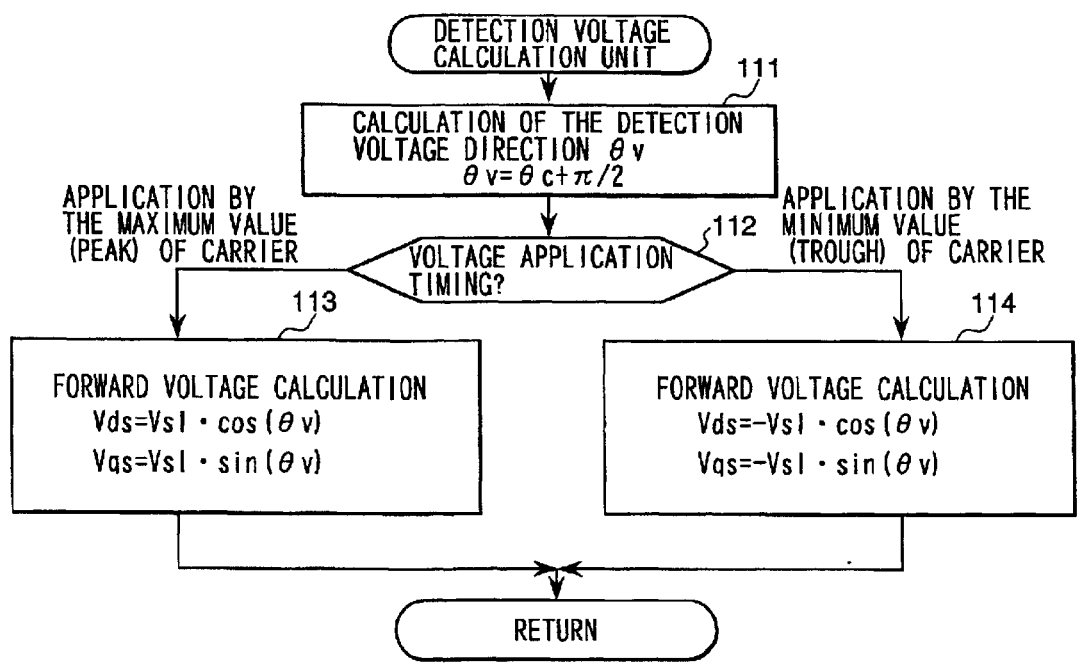
FIG. 9 is a flow chart of the process executed by the detection calculation unit in the second embodiment shown in FIG. 8.

FIG. 9 is a flow chart of the process executed by the detection voltage calculation unit 20.

Step 111

The detection voltage direction θv is obtained by calculation of (θc+π/2). The reason is that a detection voltage is applied to the d–q axis rotatory coordinate system and as shown in the vector diagrams in FIGS. 5 to 7, the phase difference between the a–s axis static coordinate system which is a static coordinate system and the dc–qc axis rotatory coordinate system is θc.

Step 112

In the same way as with Step 102 mentioned above, the detection voltage calculation unit 20 judges the timing of voltage application and branches the process. In this case, the detection voltage is changed every a half period of the carrier. However, when the application period of the control voltage is equal to two periods of the carrier, the judgment change at Step 112 may be executed every one period of the carrier.

Step 113

The detection voltages Vds and Vqs applied at the point of time when the carrier is maximized are calculated.

Step 114

The detection voltages Vds and Vqs applied at the point of time when the carrier is minimized are calculated.

The processing method shown in FIG. 9 has an advantage compared with the processing method shown in FIG. 3 that there are very few calculation contents.

Further, the second embodiment is added with a current sensor error detection unit 21. Generally, a method for detecting an error of the current sensor using that the sum of three-phase currents is 0 is known. However, in the second embodiment shown in FIG. 8, in the same way as with the first embodiment shown in FIG. 1, the current sensor 5u of U-phase is structured so as to use an inexpensive sensor having a function for detecting only the AC amount, so that to detect existence or no-existence of an error of the current sensor, a new detection method must be designed.

Figure 10:
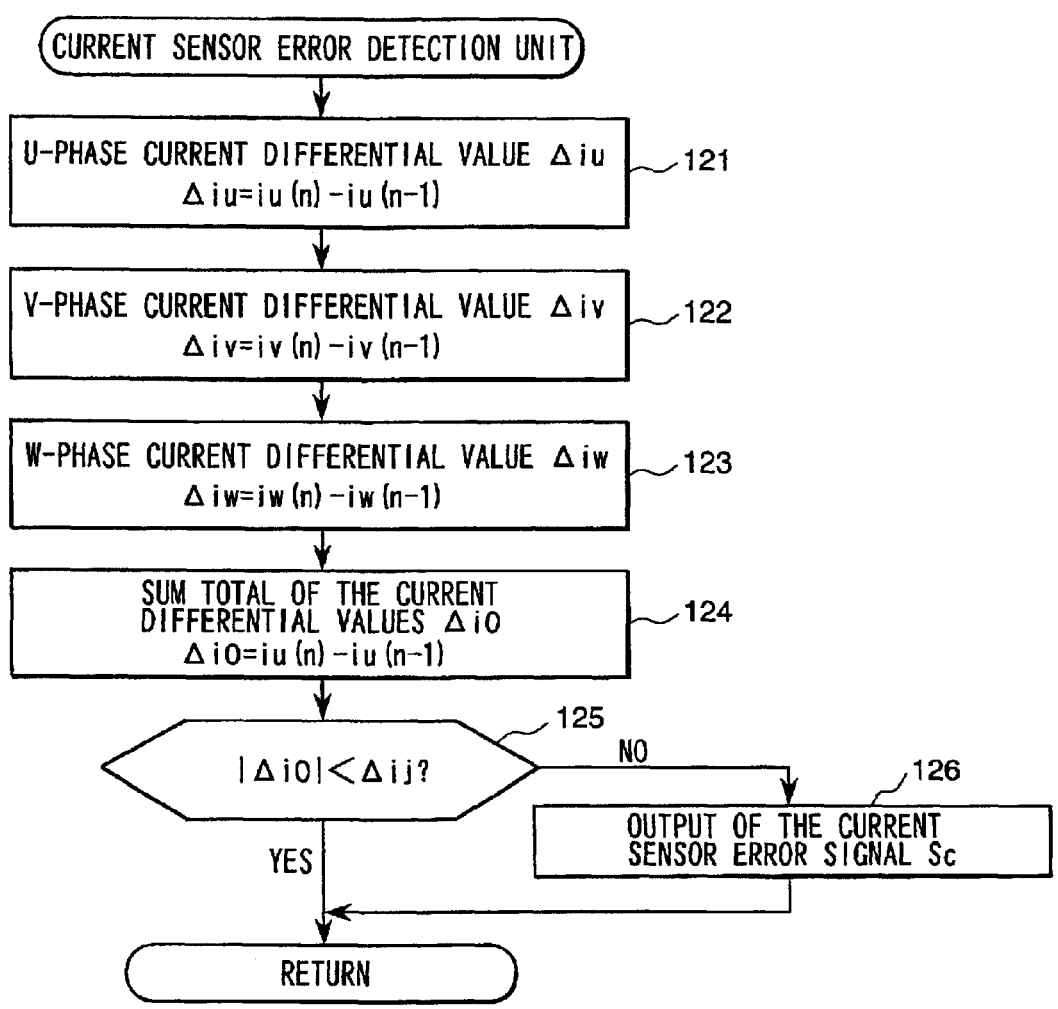
FIG. 10 is a flowchart of the current sensor error detection process executed by the current sensor error detection unit in the second embodiment shown in FIG. 8.

FIG. 10 is a flowchart of the current sensor error detection process executed by the current sensor error detection unit 21.

Step 121

The U-phase current difference $\Delta iu$ is obtained from the difference between the U-phase current $iu(n)$ at the time $t(n)$ and the U-phase current $iu(n-1)$ at the time $t(n-1)$. In this case, the time (n) means the point of time of the minimum value of the carrier and concretely, it is equivalent to the times t2 and t4 shown in FIG. 2. Further, the time (n−1) means the point of time of the maximum value of the carrier and in the same way, it is equivalent to the times t1 and t3 shown in FIG. 2. Further, with respect to the U-phase current, the current sensor 5u for detecting only the AC component is used, so that a value different from the current actually flowing is detected, while the U-phase current difference $\Delta iu$ which is a fluctuation component is the same as the real value.

Step 122

The U-phase current difference $\Delta iv$ is obtained in the same way.

Step 123

The W-phase current difference $\Delta iw$ is obtained in the same way.

With respect to the V phase and W phase, for the purpose of execution of current control during stop and at a low speed, a current sensor capable of also detecting the DC component may be used.

Step 124

The sum total $\Delta i0$ of 3-phase current differences is calculated. In a general case that a zero-phase current does not flow in the synchronous motor 1, the sum total of 3-phase currents is 0, so that the sum total $\Delta i0$ of 3-phase current differences is also 0.

Step 125

Whether the sum total $\Delta i0$ of current differences is less than a predetermined decided value $\Delta ij$ or not is decided. When the sum total $\Delta i0$ is less than the decided value $\Delta ij$, the current sensor error detection unit 21 judges that the current sensor is normal and ends the process, and when the sum total $\Delta i0$ is the decided value $\Delta ij$ or more, the process is branched to Step 126.

Step 126

The current sensor error detection unit 21 generates a current sensor error signal Sc and inputs it to the PWM signal generation unit 8. The PWM signal generation unit 8, when the current sensor error signal Sc is input, stops generation of the PWM signals Pu, Pv, and Pw and stops the synchronous motor 1.

When the current sensors 5u, 5v, and 5W enter an error state like this, the synchronous motor 1 is stopped, thus the high reliability of the position sensorless control system for executing highly efficient current control is ensured.

Figure 11:
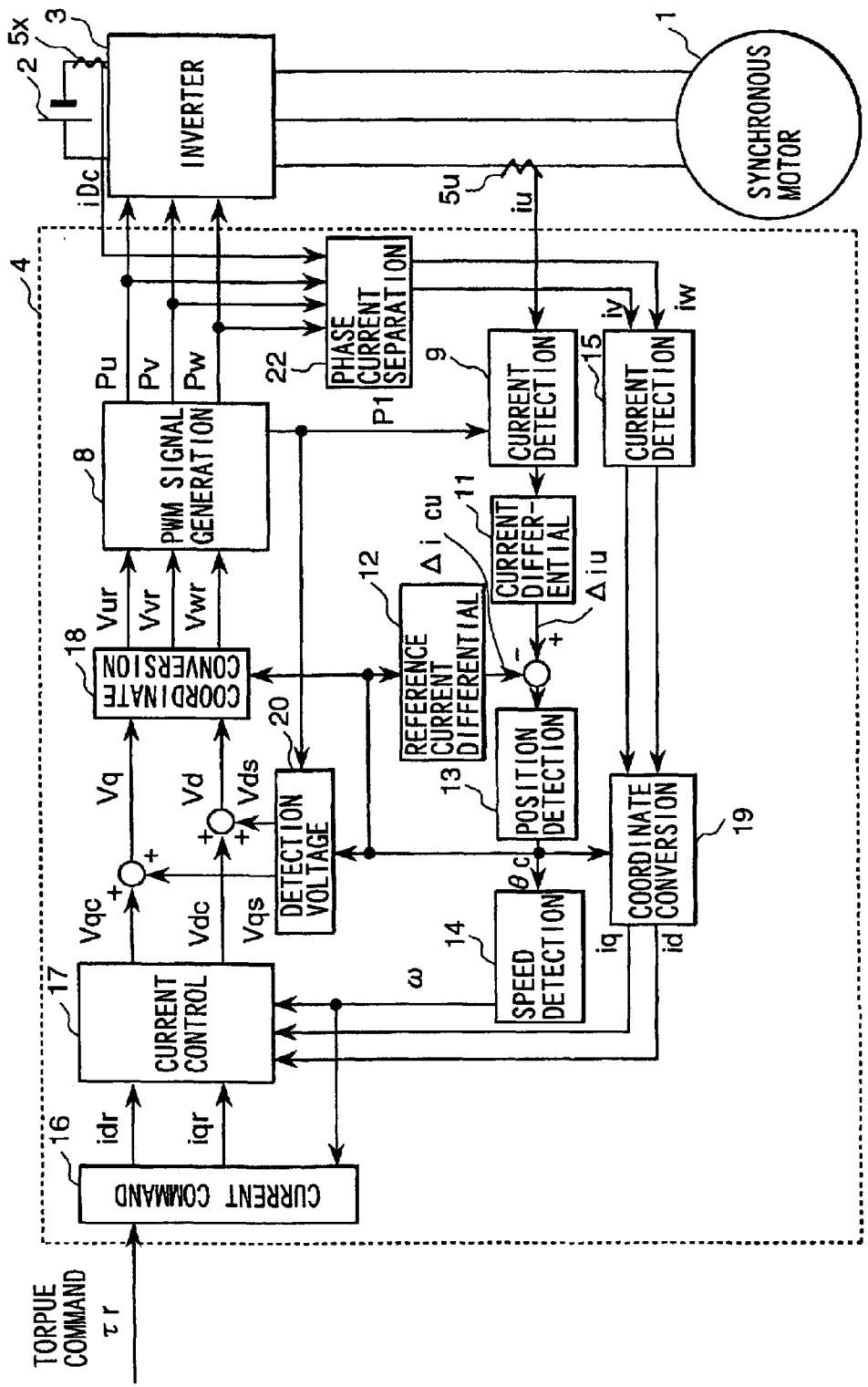
FIG. 11 is a block diagram of a motor control system showing the third embodiment of the present invention.

FIG. 11 is a block diagram of a motor control system showing the third embodiment of the present invention. This embodiment is an embodiment that a motor control system having the equivalent performance to that of the motor control system of the second embodiment is structured at a low price. For the constitution duplicated with the aforementioned embodiment, the explanation will be omitted.

The third embodiment has a constitution that one current sensor 5x for detecting the input current of the inverter 3 is used instead of the current sensors 5v and 5w, and the input current iDC detected by the current sensor 5x and the PWM signals Pu, Pv, and Pw of each phase are input to a phase current separation unit 22, and the V-phase current iv and the W-phase current iw are obtained by calculation.

From the logic of the PWM signals Pu, Pv, and Pw of three-phase, the relation between the input current iDC and the currents of each phase is found. For example, when the PWM signal Pu is on the high level and the PWM signals Pv and Pw are on the low level, the power element on the upper side of the V phase and the power elements on the lower side of the U phase and W phase in the 3-phase bridge circuit of the inverter 3 are turned on, so that the input current iDC agrees with the positive V-phase current. Further, when the PWM signals Pu and Pv are on the high level and the PWM signal Pw is on the low level, the power elements on the upper side of the U phase and V phase and the power element on the lower side of the W phase are turned on, so that the input current iDC agrees with the negative W-phase current. By tabling the relation between this pattern of the PWM signals Pu, Pv, and Pw and the phase currents, the current of each phase can be obtained on the basis of the detected input current iDC and the PWM signals Pu, Pv, and Pw. The phase current separation unit 22 obtains the V-phase current iv and the W-phase current iw on the basis of this relation between the input current iDC, the PWM signals Pu, Pv, and Pw, and each phase current. This constitution can reduce the number of current sensors to be used. Further, the current sensor 5u for position detection is used to detect a current of one phase (U phase in this case) every predetermined timing synchronized with the carrier.

According to the controller of the third embodiment, a rapid-response position sensorless control system can be realized at a low price.

Figure 12:
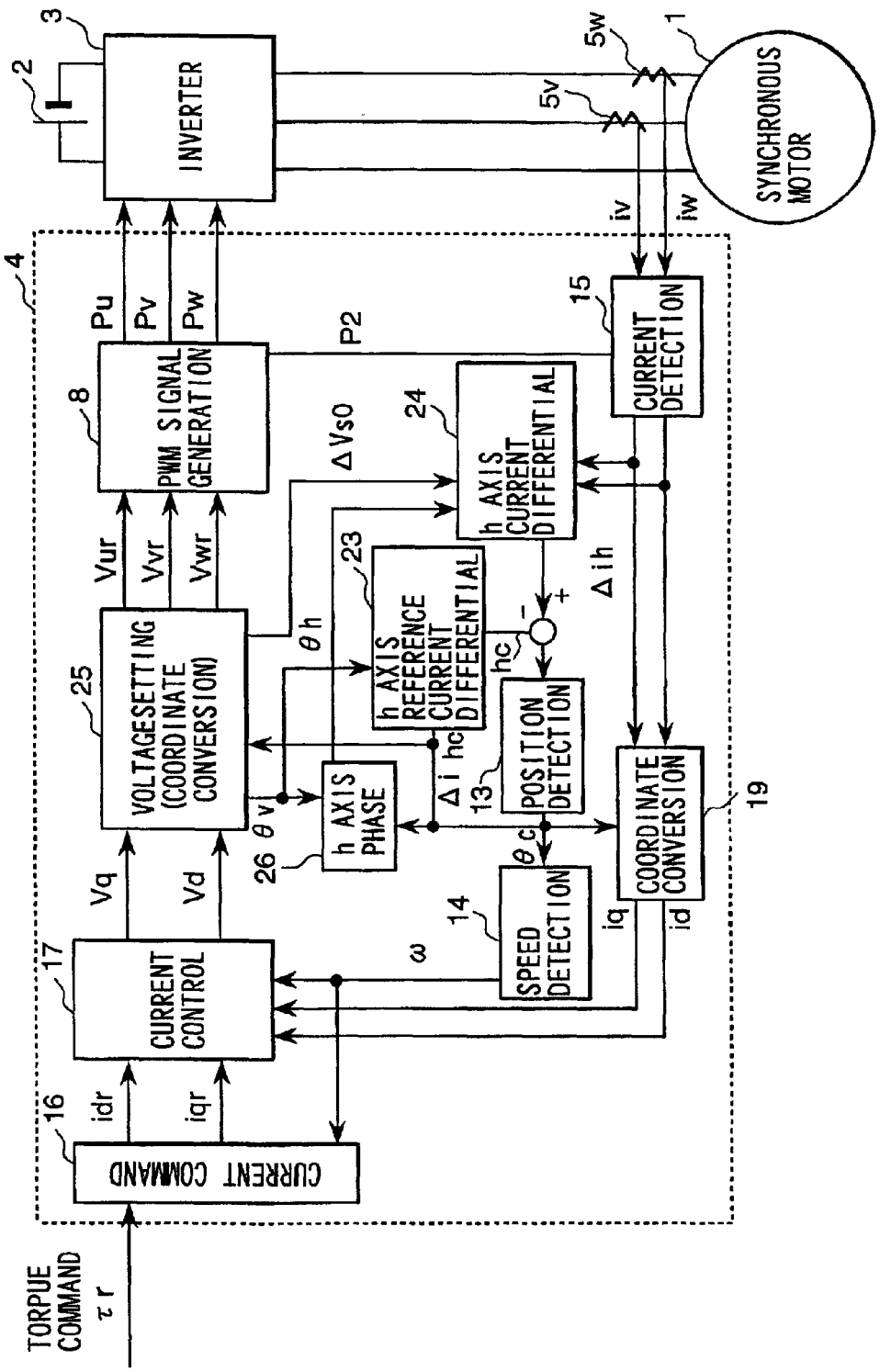
FIG. 12 is a block diagram of a motor control system showing the fourth embodiment of the present invention.

FIG. 12 is a block diagram of a motor control system showing the fourth embodiment of the present invention. This embodiment is structured so as to detect the phase current without applying a detection voltage at the timing showing the same phenomenon as that when the detection voltage is applied, thereby realize detection of the rotor position using the saliency of the synchronous motor 1, prevent an increase in the loss due to an increase in noise and pulsation of the current by applying the detection voltage, and realize a rapid-response position sensorless control system at a low price.

Therefore, the current differential vector is detected using two current sensors. The fourth embodiment shown in FIG. 12 constitutes a current control system for the torque command τr in the same way as with the second embodiment shown in FIG. 8. However, a method for applying no detection voltage, obtaining a voltage vector instead of it, and inferring the rotor position θc is different. For the complicate constitution with the aforementioned embodiment, the explanation will be omitted.

Figure 13:
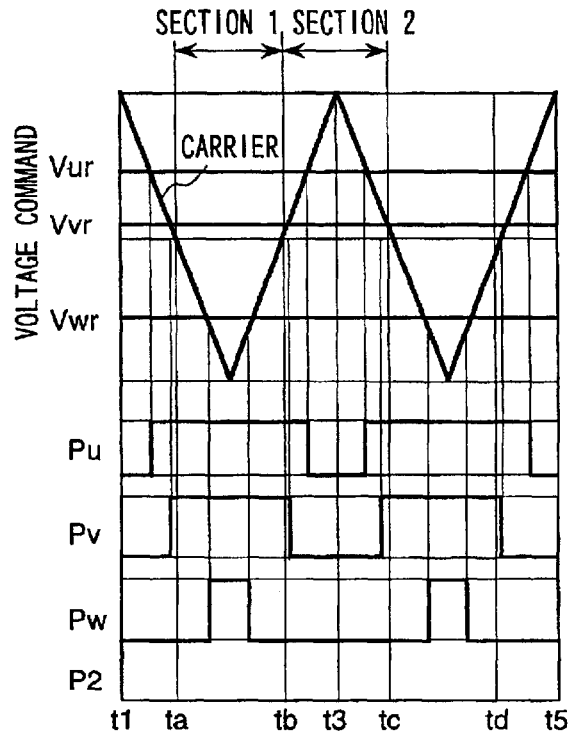
FIG. 13 is a time chart showing the relation between the voltage of each phase, PWM signal, and carrier synchronizing signal in the fourth embodiment shown in FIG. 12.

In the fourth embodiment, the PWM signal generation unit 8 generates a carrier synchronizing signal P2 for current detection at timing different from that of the carrier synchronizing signal P1 of the aforementioned embodiment. The carrier synchronizing signal P2, as shown in the time chart in FIG. 13, is generated so as to detect the current of each phase at the times ta, tb, tc, and td when the carrier takes an intermediate value.

The current detection unit 15 fetches the V-phase current iv and the W-phase current iw at the generation timing of the carrier synchronizing signal P2. The application condition of the voltage of each phase at this time will be explained by referring to FIG. 13. Further, during the period from the time t1 to t5, it is assumed that the voltages (control voltages Vur, Vvr, and Vwr) to be applied to each phase are not changed.

The mean voltage of each phase during the period from the time t1 to t5 (or t3) is naturally Vur, Vvr, and Vwr respectively. However, as the PWM signals Pu, Pv, and Pw, show, in the section A between the times ta and tb, the U-phase voltage and V-phase voltage are maximum values and the W-phase voltage is a negative value, while in the section B between the times tb and tc, the U-phase voltage is close to 0, and the V-phase voltage is a negative value, and the W-phase voltage is a minimum value. Namely, between the section A and the section B, there is a difference in the voltage vector to be applied. This is called a voltage difference vector $\Delta$Vs. In the time chart of the first embodiment shown in FIG. 2, the positive and negative detection voltage vectors are additionally applied in the sections 1 and 2 so as to generate a difference in the voltage vector. However, when the current detection timing is set as in the fourth embodiment, an equivalent state to that when the detection voltage is applied can be set.

Figure 14:
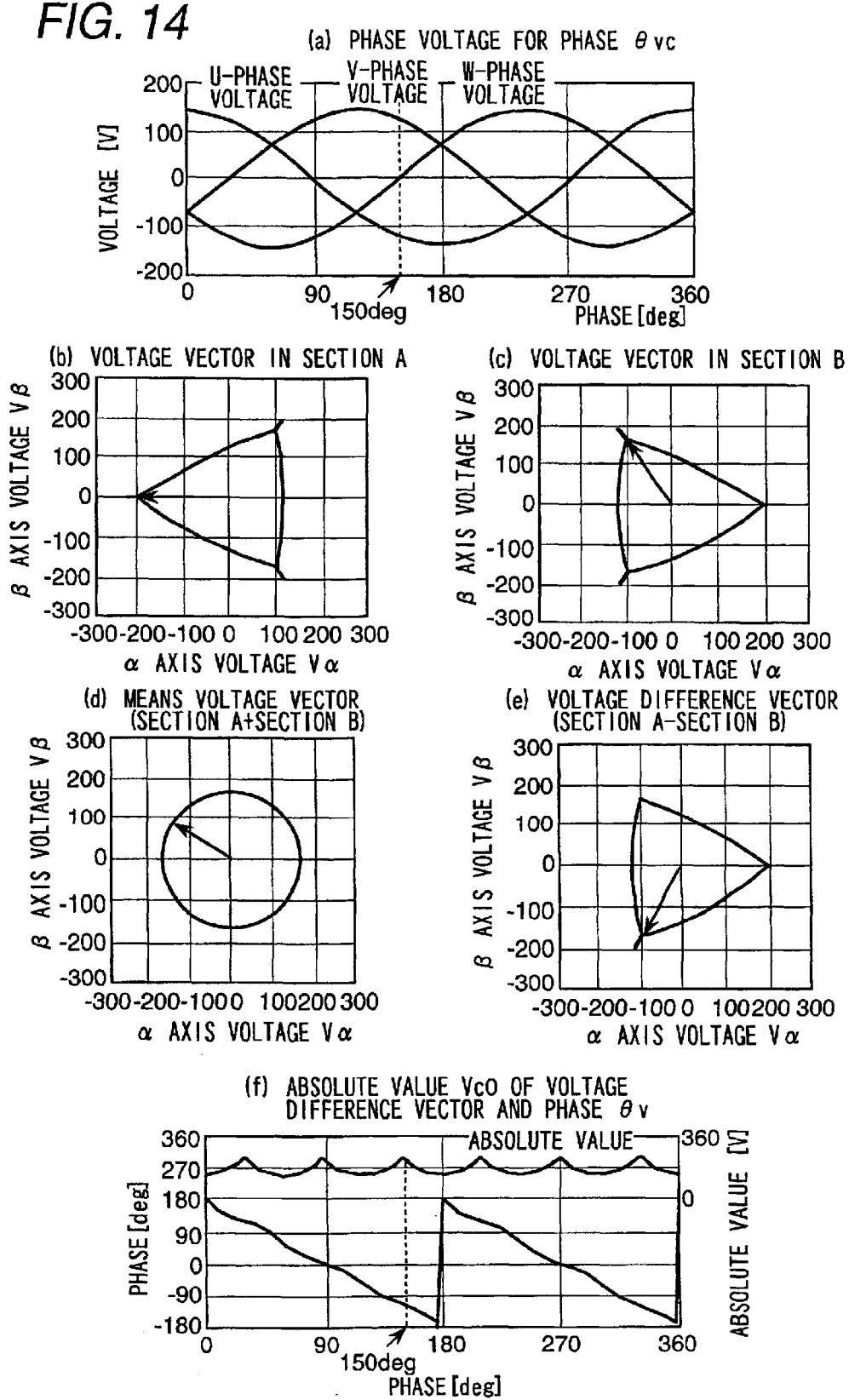
FIG. 14 is a time chart and Lissajous waveform diagram showing the relation between the sine wave voltage of each phase and the voltage difference vector in the fourth embodiment shown in FIG. 12.

Next, the relation between the control voltage vector Vc and the voltage difference vector $\Delta$Vs will be explained by referring to FIG. 14. FIG. 14(a) shows waveforms when the voltage of each phase for the phase of the control voltage vector is a sine waveform. In this case, the Lissajous waveforms of the voltage vectors in the sections A and B are respectively as shown in (b) and (c) and formed like a bulged triangle. In this case, the arrows shown in (b) and (c) indicate voltage vectors when the phase of the control voltage vector is 150 degrees. Further, the mean voltage vector in the sections A and B is a circle as shown in (d) and the phase of the mean voltage vector indicated by the arrow is 150 degrees. The average of the two voltage vectors indicated by the arrows in (b) and (c) is the mean voltage vector in (d). The Lissajous waveform of the mean voltage vector is naturally circular because it indicates a voltage vector of a sine wave.

The Lissajous waveform of the voltage difference vector $\Delta$Vs is as shown in (e) and the voltage difference vector $\Delta$Vs when the phase of the control voltage vector is 150 degrees is directed in the direction of −120 degrees. When the phase of the control voltage vector is set as a transverse axis, and the absolute value $\Delta$Vs0 of the voltage difference vector $\Delta$Vs and the phase $\Delta$v thereof are set as an ordinate axis, and the Lissajous waveform of the voltage difference vector $\Delta$Vs shown in (e) is converted, it is as shown in (f). The absolute value $\Delta$Vs0 of the voltage difference vector $\Delta$Vs pulsates in a period of ⅙ times of one period of the phase of the control voltage vector and the phase $\theta$v of the voltage difference vector $\Delta$Vs rotates two times in one period of the phase of the control voltage vector. When the control voltages Vur, Vvr, and Vwr of each phase are decided, the voltage difference vector $\Delta$Vs is decided uniquely and the control voltage vector can be calculated by tabling the phase thereof.

Therefore, in the fourth embodiment, when the control voltages Vd and Vq of the d and q axes decided by the current control unit 17 and the inferred rotor position $\theta$c output from the position detection unit 13 are input to the voltage setting unit 25, the voltage command values Vur, Vvr, and Vwr of each phase are calculated and the absolute value $\Delta$Vs0 of the voltage difference vector $\Delta$Vs and the phase $\theta$v thereof can be obtained by the table. These values are output to perform position detection calculations.

Figure 15:
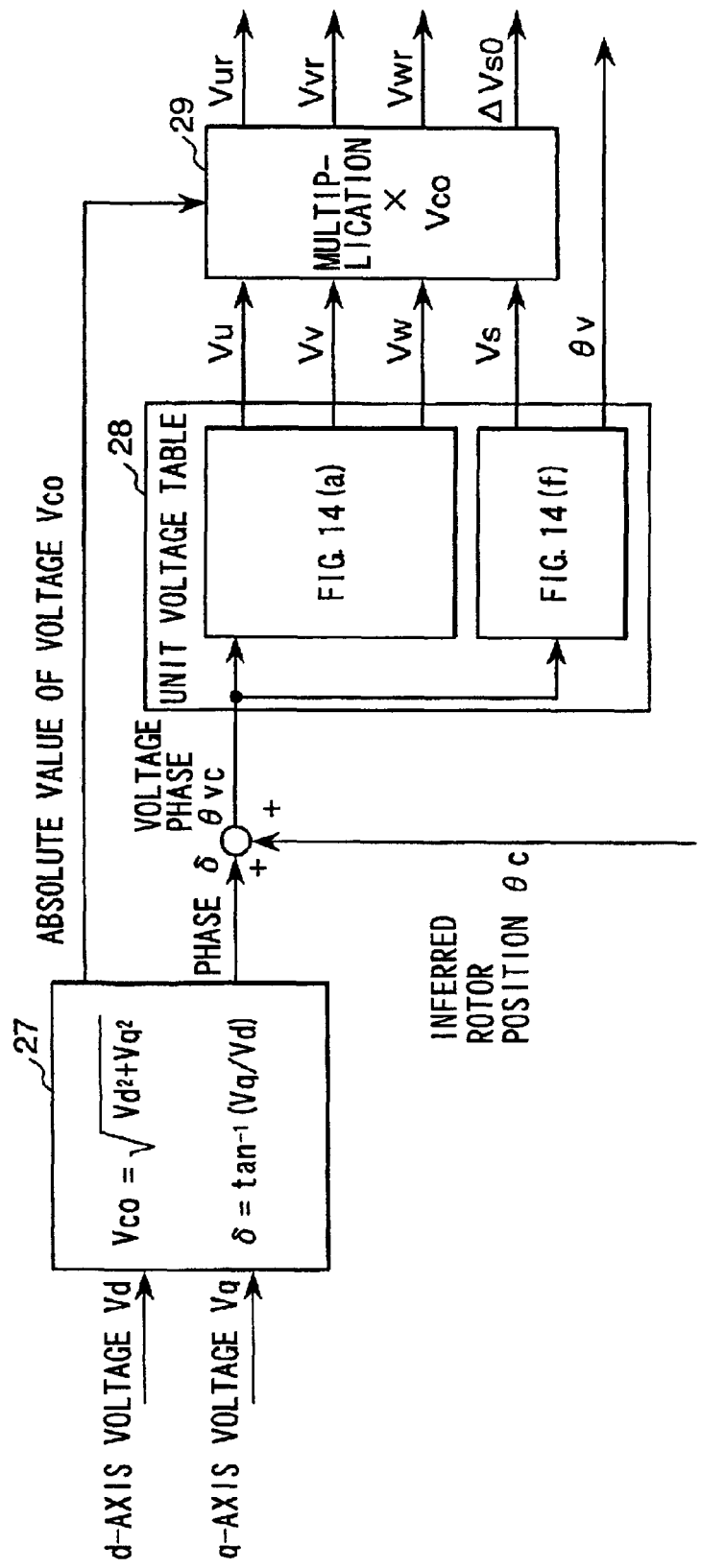
FIG. 15 is a function block diagram of the voltage setting unit in the fourth embodiment shown in FIG. 12.

The voltage setting unit 25 will be explained by referring to the function block diagram shown in FIG. 15. The voltage vector calculation unit 27 obtains the absolute value Vc0 of the control voltage vector and the vector phase $\delta$ from the dc axis on the basis of the control voltages Vd and Vq. By adding the vector phase $\theta$ and the inferred rotor position $\theta$c, the phase $\theta$vc from the $\alpha$ axis of the control voltage vector is obtained, and then the single-phase voltage table 28 is referred to, and the single-phase voltages vu, vv, and vw which are the basis for the applied voltages of each phase are obtained. In this case, the waveforms of sine wave shown in FIG. 14(a) are tabled.

Further, the absolute value $\Delta$Vs0 of the voltage difference vector $\Delta$Vs and the phase $\theta$v thereof, as shown in FIG. 14(f), are decided by the absolute value Vc0 of the control voltage vector and the phase $\theta$vc thereof. Then, in the single-phase voltage table 28, the phase $\theta$v of the voltage difference vector for the phase $\theta$vc and the unit voltage difference vs which is the absolute value $\Delta$Vs0 of the voltage difference vector when the absolute value Vc0 of the control voltage vector is 1 V are tabled, thus the unit voltage difference vs and the phase $\theta$v are calculated. The magnitude of voltage is proportional to the absolute value Vc0 of the control voltage vector, so that the products of the absolute value Vc0 of the control voltage vector, the single-phase voltages vu, vv, and vw, and the unit voltage difference vs are calculated respectively by the multiplication unit 29 and the voltage command values Vur, Vvr, and Vwr of each phase and the absolute value $\Delta$Vs0 of the voltage difference vector are obtained.

Next, a method for inferring the rotor position from the voltage difference vector will be explained. In the first embodiment shown in FIG. 1, there is a degree of freedom for applying the detection voltage vector Vs in an optional direction and it is used. Namely, the direction of the detection voltage vector Vs is decided so that a detection current difference $\Delta$is for an error of the rotor position appears in a specific direction (in the first embodiment shown in FIG. 1, the direction of the $\alpha$ axis). However, the voltage difference vector for the detection voltage vector Vs is uniquely decided when the control voltage vector is decided, so that it cannot be set in an optional direction. Therefore, the fourth embodiment has a constitution that inversely for the decided voltage difference vector and the inferred rotor position $\theta$c, the direction that the detection current difference $\Delta$is for an error of the rotor position appears is identified and control for setting the component of the detection current difference $\Delta$is in the direction to 0 is executed. Further, the direction that the detection current difference $\Delta$is appears is set as an h axis here and the phase thereof is set to $\theta$h.

When the calculation method for Formula 1 to Formula 20 is used, the phase $\theta$h of the h axis is obtained by the following formula.

$$\theta h = 2\theta c - \theta v + \pi/2 \qquad \text{(Formula 21)}$$

The h-axis phase calculation unit 26 in the fourth embodiment calculates Formula 21 on the basis of the inferred rotor position $\theta$c and the voltage difference vector phase $\theta$v and outputs the phase $\theta$v of the h axis. In this case, the h-axis reference current difference $\Delta$ihc which is the $\theta$h component in the h-axis direction of the reference current differential vector $\Delta$ic is obtained by the following formula.

$$\Delta ic = \Delta i\alpha c \cdot \cos\theta h + \Delta i\beta c \cdot \sin\theta h \qquad \text{Formula 22}$$

$$= (1/2)\cdot Vs0 \cdot \Delta t \cdot [\{(1/Ldc + 1/Lqc)\cos\theta v +$$

$$(1/Ldc + 1/Lqc)\cos(\theta v - 2\theta c)\}\cos\theta h +$$

$$\{(1/Ldc + 1/Lqc)\sin\theta v - (1/Ldc - 1/Lqc)$$

$$\sin(\theta v - 2\theta c))\}\sin\theta h]$$

$$= (1/2)\cdot Vs0 \cdot \Delta t \cdot [(1/Ldc + 1/Lqc)\cos\theta v$$

$$\cos\theta h + \sin\theta v \sin\theta h) + (1/Ldc - 1/Lqc)$$

$$\{\cos(\theta v - 2\theta c)\cos\theta h - \sin(\theta v - 2\theta c)\sin\theta h\}]$$

$$= (1/2)\cdot Vs0 \cdot \Delta t \cdot [(1/Ldc + 1/Lqc)\cos$$

$$(\theta v - \theta h) + (1/Ldc - 1/Lqc)\cos(\theta v - 2\theta c + \theta h)]$$

$$= (1/2)\cdot Vs0 \cdot \Delta t \cdot (1/Ldc + 1/Lqc)\cos$$

$$(2\theta v - 2\theta h - \pi/2)$$

$$= (1/2)\cdot Vs0 \cdot \Delta t \cdot (1/Ldc + 1/Lqc)\sin 2(\theta v - \theta c)$$

where Vs0 is the absolute value of the voltage differential vector ΔVs. The absolute value ΔVs0, as shown in FIG. 14(f), varies with the phase of the control voltage vector, so that the h-axis reference current differential calculation unit 23 obtains the h-axis reference current difference Δihc using the following formula on the basis of the current change per unit voltage.

$$\Delta ihc = (\tfrac{1}{2})\cdot \Delta t \cdot (1/Ldc + 1/Lqc)\sin 2(\theta v - \theta c)$$

Next, the real current difference Δih in the direction of the h axis is obtained by the h-axis current differential calculation unit 24.

Step 131

The V-phase and W-phase current differences Δiva and Δiwa in the section A are calculated. Symbols iv(ta), iv(tb), and iv(tc) indicate V-phase currents respectively at the times ta, tb, and tc shown in FIG. 13. In the same way, symbols iw(ta), iw(tb), and iw(tc) indicate W-phase currents respectively at the times ta, tb, and tc.

Step 132

The V-phase and W-phase current differences Δivb and Δiwb in the section B are calculated.

Step 133

From the difference between the current differences in the sections A and B, the V-phase and W-phase current differences Δiv and Δiw are obtained. Further, the U-phase current difference Δiu is obtained by calculation of (−Δiv−Δiw). These current differences indicate changes in the current due to the voltage difference vector ΔVs which is the difference in the applied voltages in the sections A and B.

Step 134

On the basis of the 3-phase current differences Δiu, Δiv, and Δiw, the h-axial phase θh, and the absolute value ΔVs0 of the voltage difference vector, the h-axial current difference Δih is obtained. In this case, division by the absolute value ΔVs0 means the current difference per unit voltage.

The difference between the h-axial current difference Δih and the h-axial reference current difference Δihc obtained in this way is the difference between the rotor position θ and the inferred rotor position θc, so that the inferred rotor position θc can be converged to the rotor position θ using the proportion-integration calculation by the position detection unit 13 so as to set the difference between the h-axial current difference Δih and the h-axial reference current difference Δihc to 0. This principle is the same as that of the first embodiment. However, the reason that the function block is complicate is that the current change of the rotatory coordinate system of the h axis is detected instead of the current change in the direction of the α axis (U-phase direction).

Figure 17:
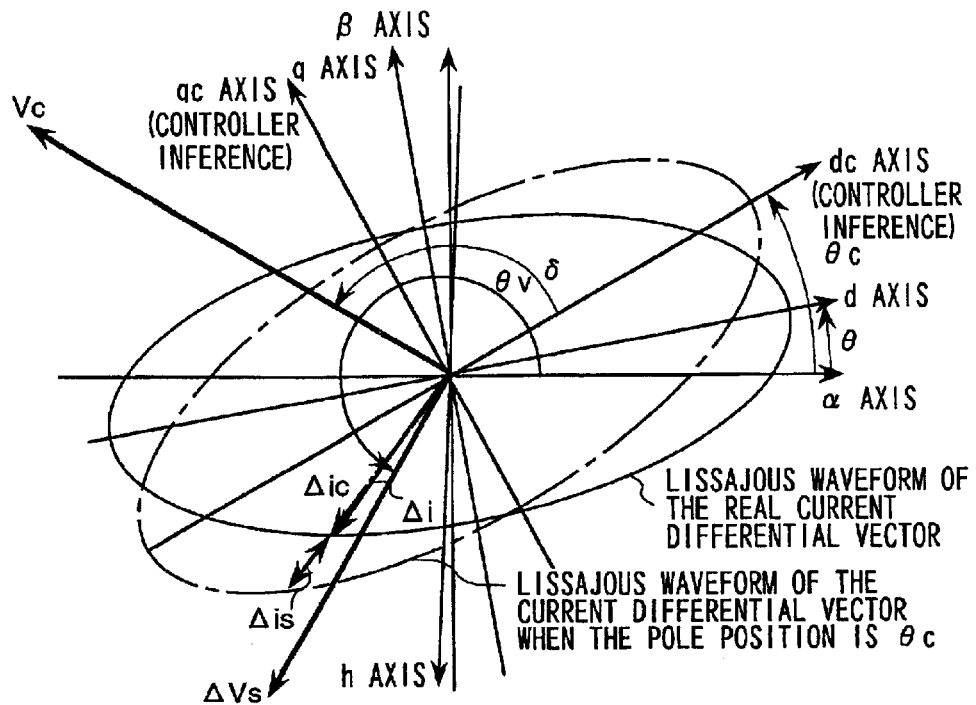
FIG. 17 is a vector diagram showing the relation between the control voltage vector, voltage difference vector, and current differential vector in the fourth embodiment shown in FIG. 12.

The detection principle of the rotor position will be explained in detail by referring to the concrete vector diagram shown in FIG. 17. FIG. 17 shows, in the same way as with FIG. 5, the condition that the inferred rotor position θc inferred by the controller 4 is shifted in the direction proceeding more than the real rotor position θ. The voltage difference vector ΔVs varies with the control voltage vector Vc, so that in FIG. 17, a case that the phase θvc of the control voltage vector Vc is 150 degrees will be explained.

The voltage difference vector ΔVs in this case, as shown in FIG. 14(e), is directed in the direction of −120 degrees. For the voltage difference vector ΔVs, the real current differential vector Δi and the reference current differential vector Δic are respectively the arrow of a solid line and the arrow of a dashed line shown in FIG. 17. Therefore, the detection current differential vector Δic, as shown in FIG. 17, is directed in the direction of the first quadrant. Then, in consideration of the h axis obtained from Formula 21, it is found that it is the third quadrant close to −90 degrees. Therefore, the h-axial component of the detection current differential vector Δis is negative and it may be said that the real rotor position θ is smaller than the inferred rotor position θc. When the value is input to the position detection unit 13, the position detection unit 13 calculates so as to make the inferred rotor position θc smaller, so that it gradually approaches the real rotor position θ.

Figure 19:
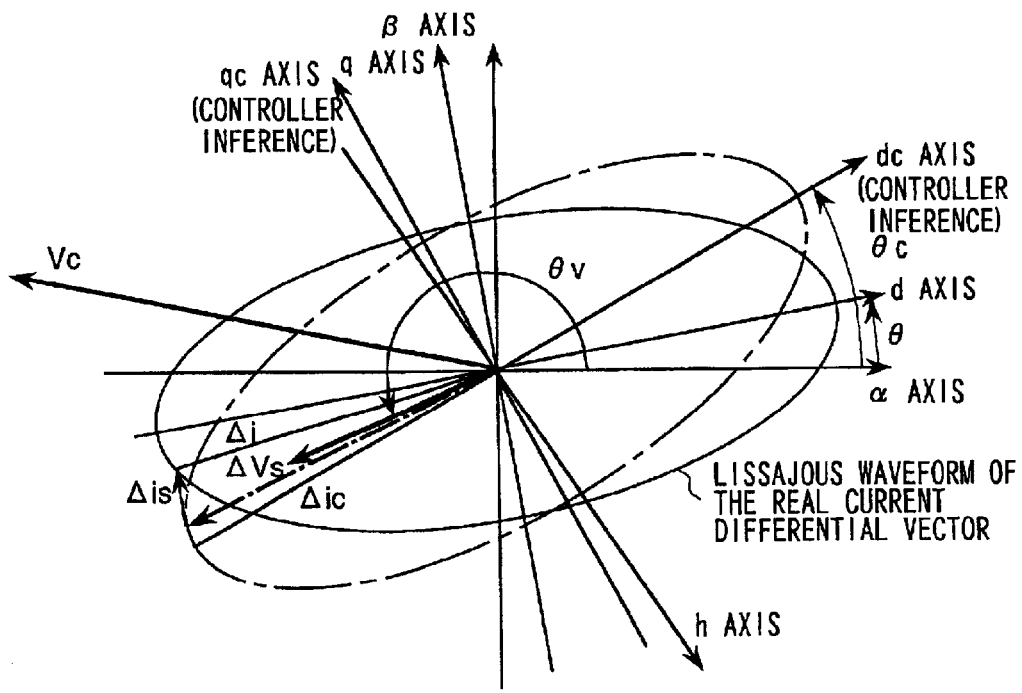
FIG. 19 is a vector diagram showing the relation between the control voltage vector, voltage difference vector, and current differential vector in the fourth embodiment shown in FIG. 12.
Figure 18:
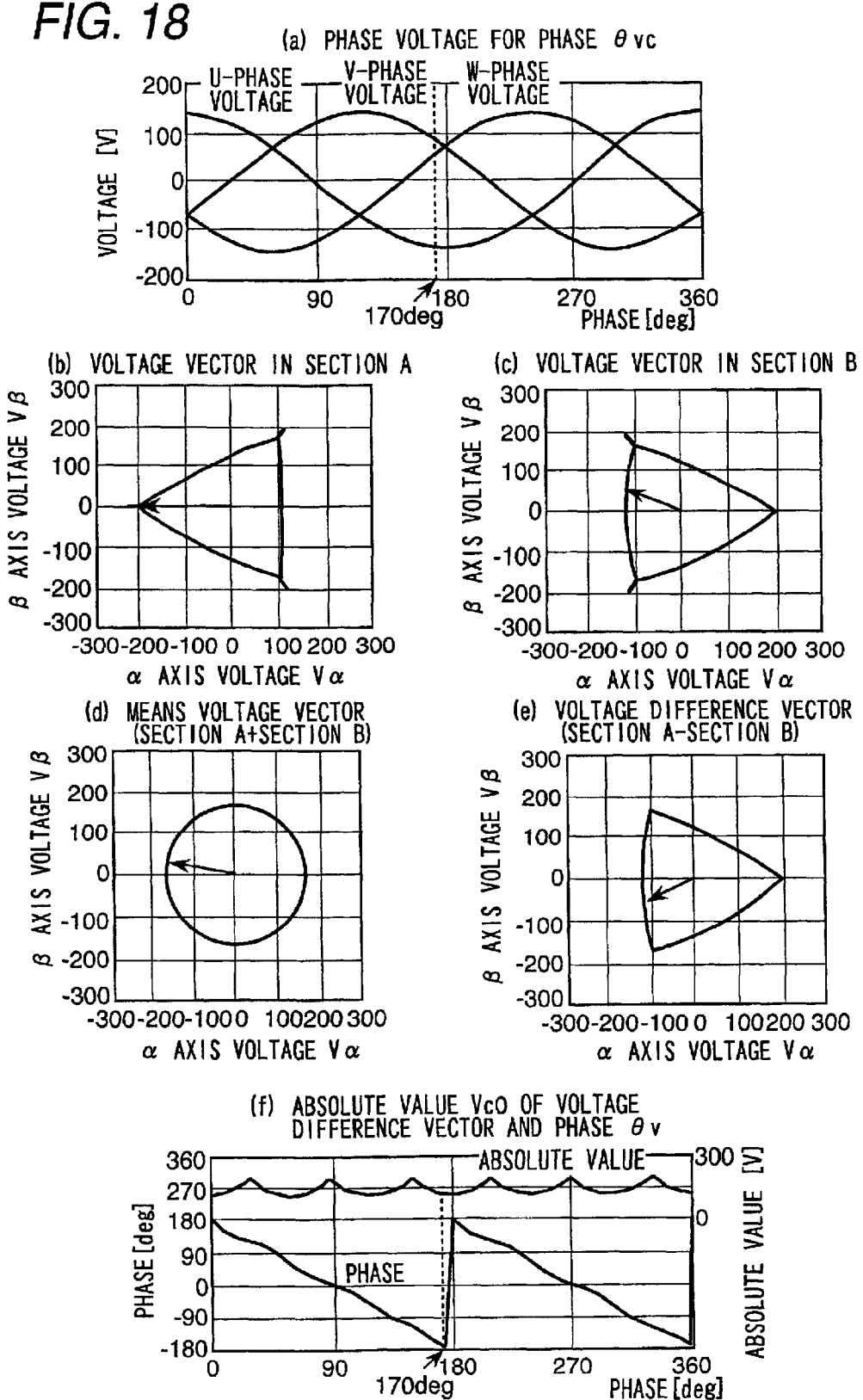
FIG. 18 is a time chart and Lissajous waveform diagram showing the relation between the sine wave voltage of each phase and the voltage difference vector in the fourth embodiment shown in FIG. 12.

Next, even when the control voltage vector Vc is different from the example shown in FIG. 17, it will be explained by referring to FIGS. 18 and 19 that position detection is possible.

As shown in FIG. 18(e), when the control voltage vector Vc is at 170 degrees, the voltage difference vector ΔVs is directed in the direction close to −150 degrees. Further, FIG. 18(f) shows that the absolute value ΔVs0 thereof is made smaller than that shown in FIG. 17. FIG. 19 is a vector diagram at this time.

Figure 16:
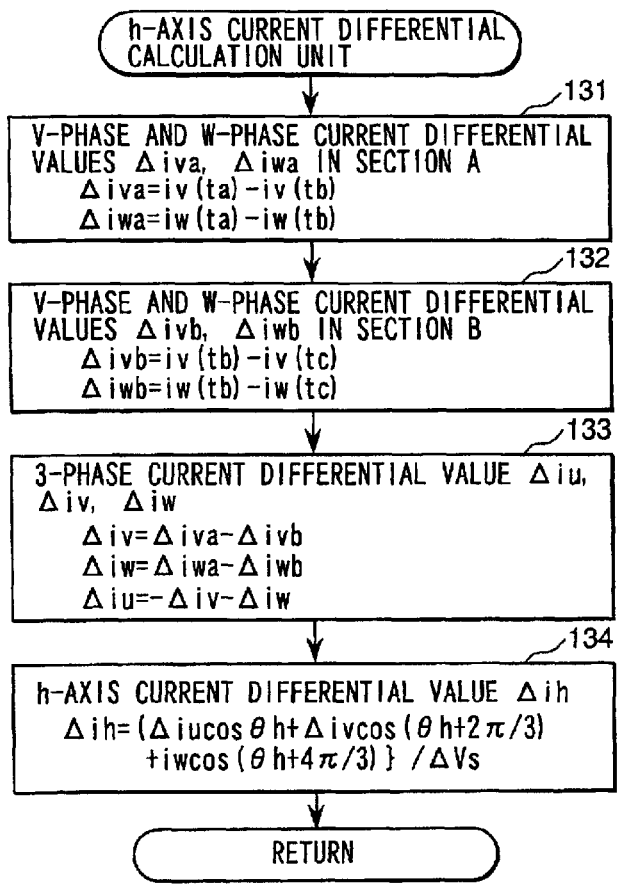
FIG. 16 is a flow chart of the process executed by the h-axis current differential calculation unit in the fourth embodiment shown in FIG. 12.

The control voltage vector Vc and the voltage difference vector ΔVs are changed compared with the case shown in FIG. 17. Therefore, the current differential vector Δi and the reference current differential vector Δic are also changed. Actually, the absolute value of the voltage difference vector ΔVs is reduced and the magnitudes of the current differential vector Δi and the reference current differential vector Δic are also changed. FIGS. 17 and 19 show current changes per unit voltage. This process is the one executed at Step 134 shown in FIG. 16.

Due to such a relation, the detection current differential vector Δis is directed in the direction of the second quadrant. On the other hand, the h axis is in the fourth quadrant, so that the h-axial component of the detection current differential vector Δis has a negative value in the same way as with FIG. 17. Therefore, it is found that the inferred rotor position θc at that time proceeds than the real rotor position θ. Namely, when the detection current difference component in the direction of the h axis is detected regardless of the direction of the control voltage vector Vc, the shift of the rotor position can be inferred. By this method, the shift of the rotor position can be detected every period of the PWM signal using the saliency of the rotor, so that the rotor position can be inferred at high speed.

According to the fourth embodiment, from the waveform of the PWM signal generated by the control voltage, a voltage difference equivalent to the detection voltage can be obtained, so that the current changing condition for the voltage difference is detected without applying the detection voltage and the rotor position can be inferred at high speed. Therefore, according to the fourth embodiment, a rapid-response position sensorless control system can be realized free of noise generated by addition of the detection voltage and an increase in loss.

Figure 20:
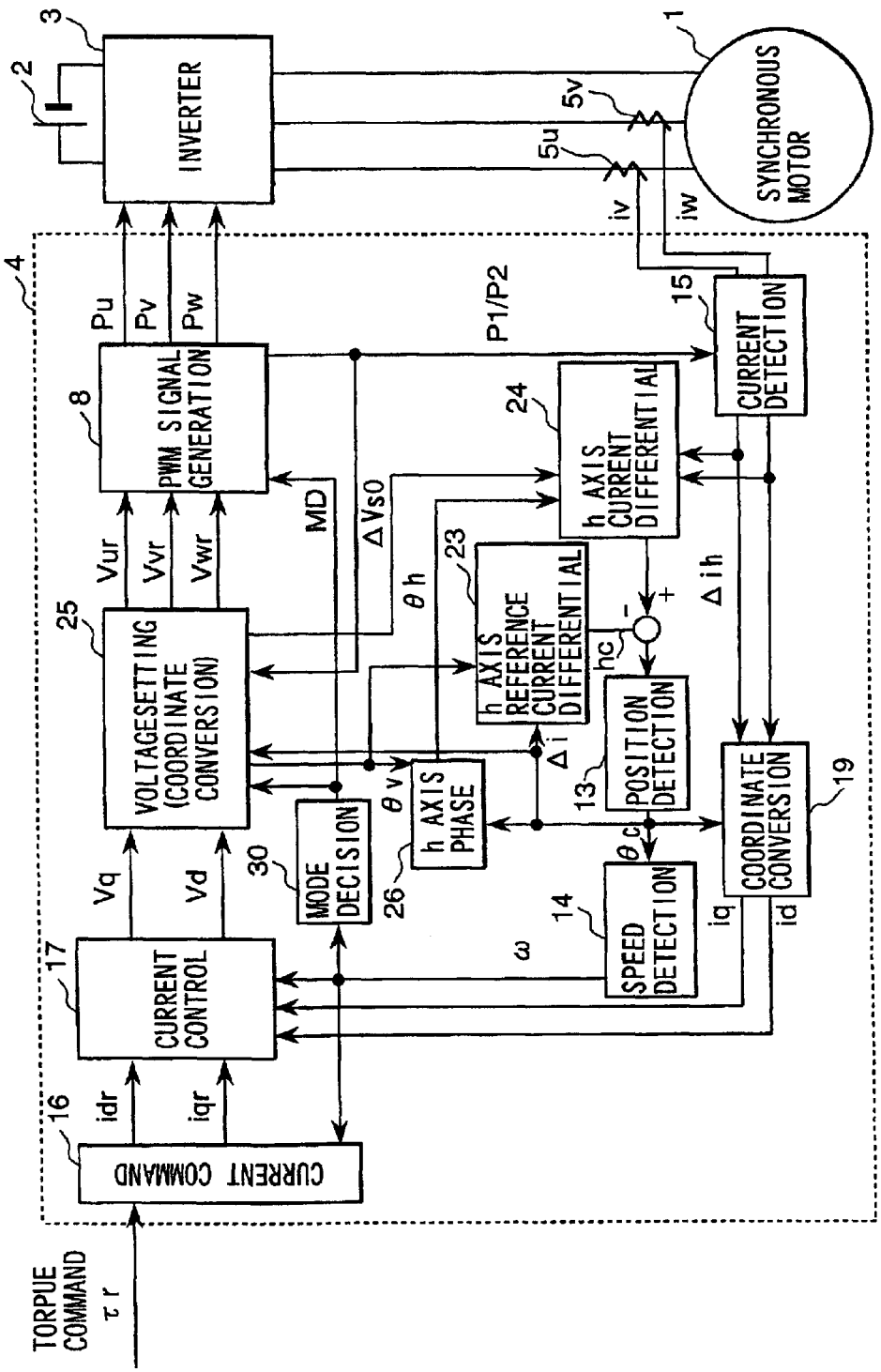
FIG. 20 is a block diagram of a motor control system showing the fifth embodiment of the present invention.

The fifth embodiment of the present invention will be explained by referring to FIG. 20. The fifth embodiment has a constitution of changing the calculation method for detection of the rotor position according to the motor speed ω. The fourth embodiment shown in FIG. 12 can detect the rotor position without applying the detection voltage. However, the voltage difference vector equivalent to the detection voltage varies with the magnitude of the control voltage, so that in the low torque operation state at low speed, the voltage difference vector reduces and the position detection precision lowers. On the other hand, the detection methods shown in FIG. 1 (the first embodiment), FIG. 8 (the second embodiment), and FIG. 11 (the third embodiment) are a method for applying the detection voltage vector, so that they can detect the position precisely even in the stop state and low speed state. Therefore, the fifth embodiment has a constitution that the detection method is switched according to the motor speed ω, thus convenient position detection is realized.

A main difference of the fifth embodiment from the fourth embodiment shown in FIG. 12 is that a mode decision unit 30 is installed, and the calculation contents of the voltage setting unit 25 are changed according to the operation mode, and current detection is executed by the U-phase current sensor 5u and the V-phase current sensor 5v. Changing of the current sensor is made for simple explanation of the fifth embodiment and the phase of current detection is not limited.

Figure 21:
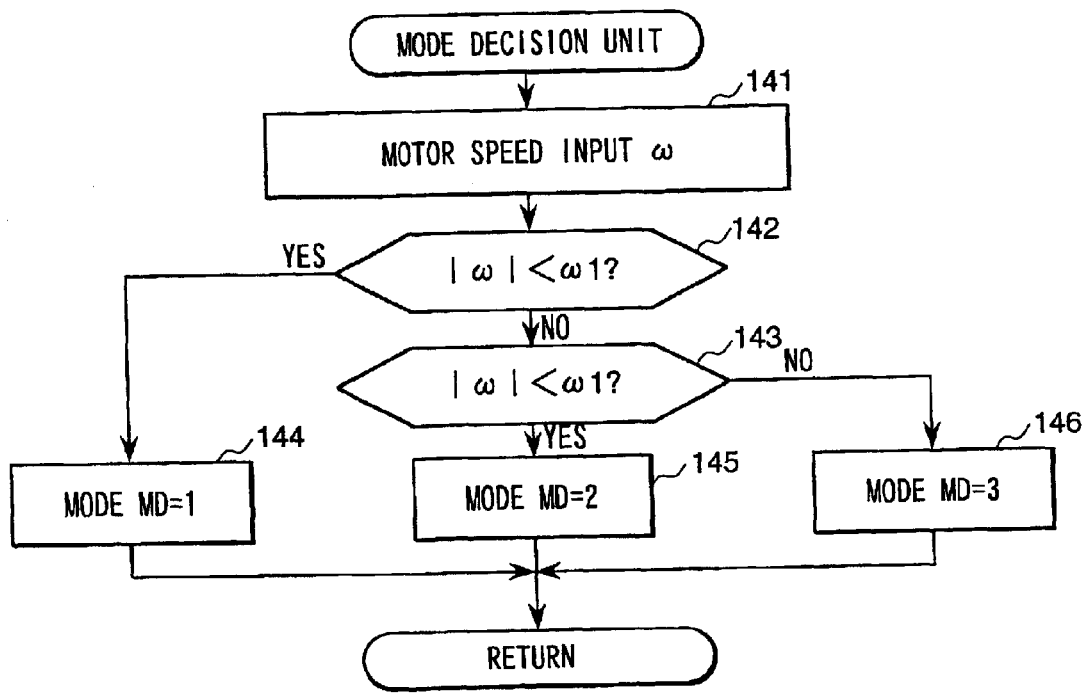
FIG. 21 is a flow chart of the process executed by the mode decision unit in the fifth embodiment shown in FIG. 20.

The function of the mode decision unit 30 will be explained by referring to the flow chart shown in FIG. 21.

Step 141

The mode decision unit 30 inputs the motor speed ω from the speed detection unit 14.

Step 142

The mode decision unit 30 compares the absolute value of the motor speed ω with the first speed ω1 and branches the process.

Step 143

When the absolute value of the motor speed ω is not lower than the first speed ω1, the mode decision unit 30 compares the absolute value with the second speed ω2 and branches the process.

Step 144

When the absolute value of the motor speed ω is lower than the first speed ω1, the mode decision unit 30 sets the mode MD to 1 (means that the synchronous motor 1 is in the low speed state including stop).

Step 145

When the absolute value of the motor speed ω is lower than the second speed ω2, the mode decision unit 30 sets the mode MD to 2 (means that the synchronous motor 1 is in the intermediate speed state).

Step 146

When the absolute value of the motor speed ω is the second speed ω2 or higher, the mode decision unit 30 sets the mode MD=3 meaning the high speed state.

The PWM signal generation unit 8 and the voltage setting unit 25 input the set mode MD.

The PWM signal generation unit 8, when the mode MD=1, outputs the carrier synchronizing signal P1 for setting the timing of current detection and when the mode MD=2 or MD=3, the PWM signal generation unit 8 outputs the carrier synchronizing signal P2. The relation between the carrier synchronizing signals P1 and P2 and the carrier is as explained by referring to FIGS. 2 and 13. This means that the mode MD=1 is based on the method of the first embodiment shown in FIG. 1 and the mode MD=2 and MD=3 are based on the method of the fourth embodiment shown in FIG. 12.

Figure 22:
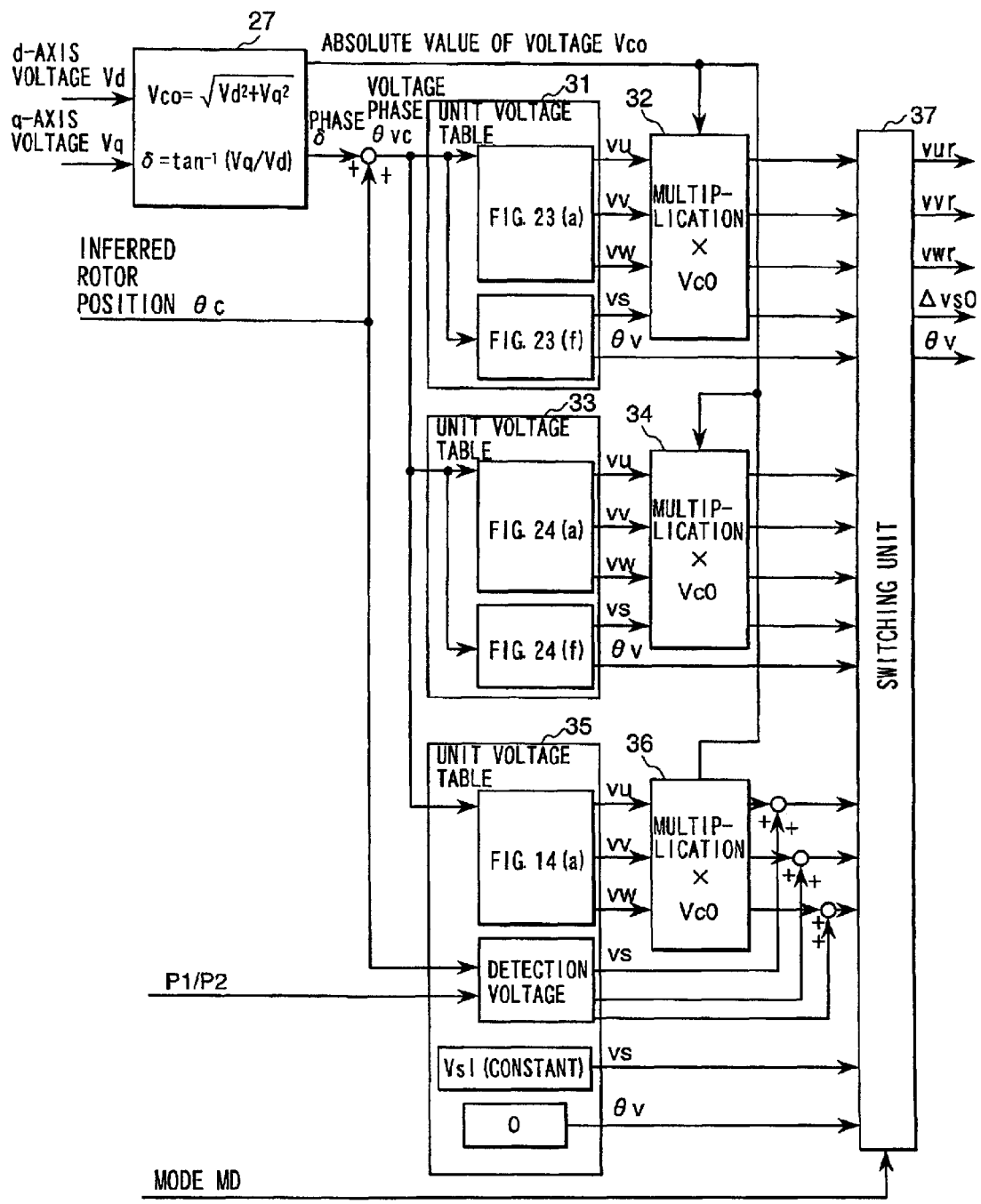
FIG. 22 is a function block diagram of the voltage setting unit in the fifth embodiment shown in FIG. 20.

The processing function of the voltage setting unit 25 will be explained by referring to FIG. 22. A difference from the voltage setting unit 25 shown in FIG. 15 is that a plurality of voltage calculation units and a switching unit are provided. The switching unit 37 selects and outputs calculation results of the first voltage calculation unit 35, the second voltage calculation units 33, and the third voltage calculation unit 31 according to the mode MD=1, 2, or 3.

When the speed ω of the synchronous motor 1 is in the low mode MD=1, the voltage setting unit 25 selects the first voltage calculation unit 35 and executes the calculation close to the process of the second embodiment shown in FIG. 8. The voltage setting unit 25 outputs the sine wave voltages shown in Fig. (a) for the voltage phase θvc, multiplies them by the absolute value Vc0 of the control voltage vector by the multiplication unit 36, thereby sets the unit voltage of each phase proportional to the control voltage to the control voltages of each phase Vuc, Vvc, and Vwc. Further, the voltage setting unit 25 decides the detection voltages of each phase Vus, Vvs, and Vws by the inferred rotor position θc by the method shown in FIG. 3 and processes so as to output them from the PWM signal generation unit 8 at the timing of the carrier synchronizing signal P1. The absolute value Vs1 of the detection voltage equivalent to the absolute value ΔVs0 of the voltage difference vector is constant, so that this value is output as the absolute value ΔVs0 of the voltage difference vector. Further, the detection voltage direction θv equivalent to the phase of the voltage difference vector is output by calculating (2θc+π/2). As Formula 21 shows, this means that the h-axial direction θh is 0, that is, it is the U-phase direction. Therefore, performing of the process of the first voltage calculation unit 35 is performing of the same calculation as that of the second embodiment shown in FIG. 8.

When the speed ω of the synchronous motor 1 is in the middle speed mode MD=2, the voltage setting unit 25 selects the second voltage calculation unit 33 and executes the calculation. The calculation basically executes the same process as that of the voltage setting unit 25 of the fourth embodiment shown in FIG. 15, though it is a difference that the table used for calculation is prepared on the basis of FIG. 24(a) and (f).

Figure 24:
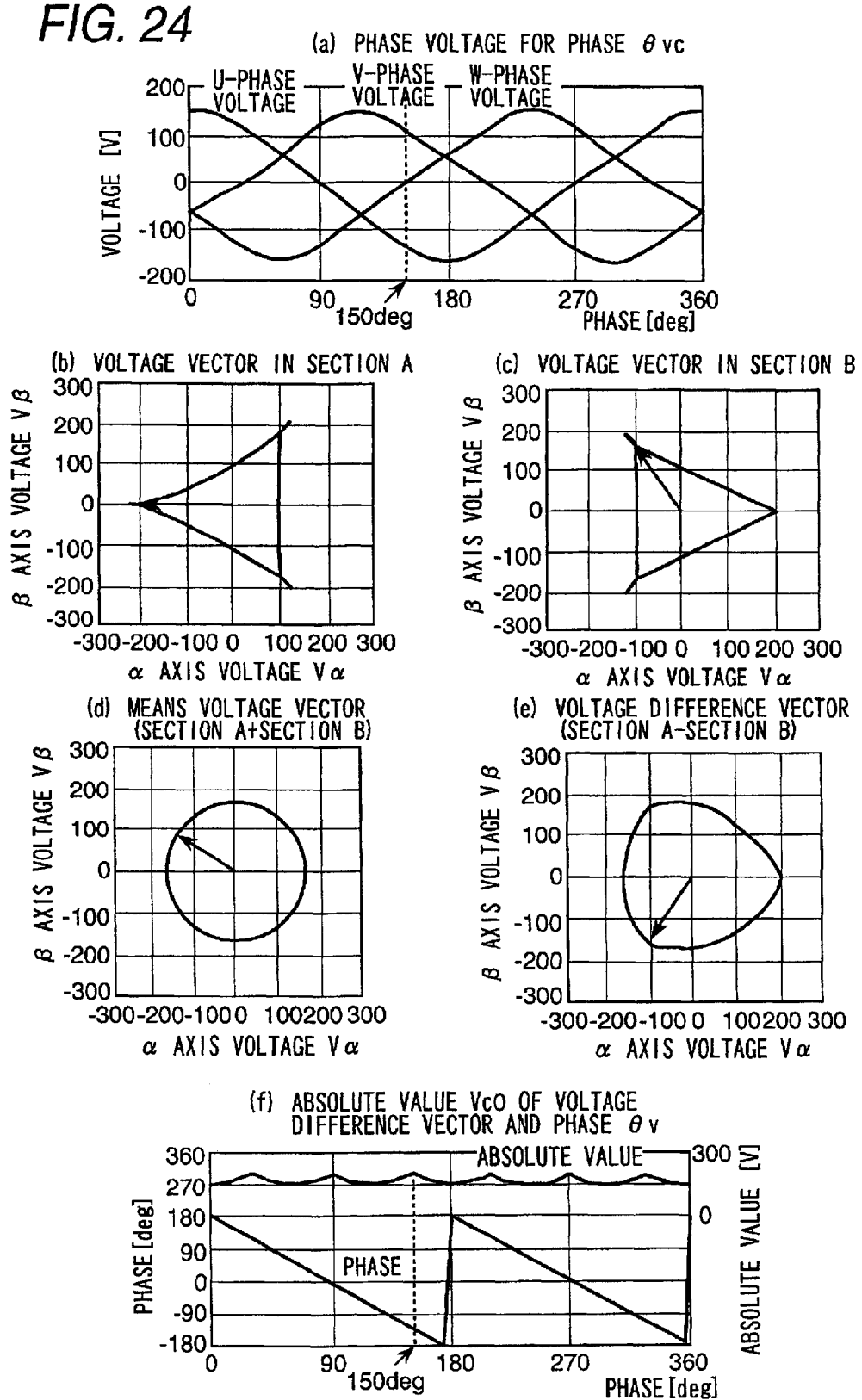
FIG. 24 is a time chart and Lissajous waveform diagram showing the relation between the sine wave voltage of each phase and the voltage difference vector in the fifth embodiment shown in FIG. 20.

In FIG. 24, the voltage of each phase has a waveform that a 0-phase voltage of triple harmonic wave is added to the normal sine wave voltage. The reason of adoption of the waveform is that as shown in FIG. 24(f), for the phase θvc of the control voltage vector, the absolute value of the voltage difference vector ΔVs is changed little and the phase is changed almost constantly. Therefore, the position detection precision can be ensured stably and the control in the middle speed rotation region can be stabilized. Further, the voltages as shown in FIG. 24(a) are ones with the 0-phase voltage added, so that the current waveform of each phase will not be adversely affected.

Figure 23:
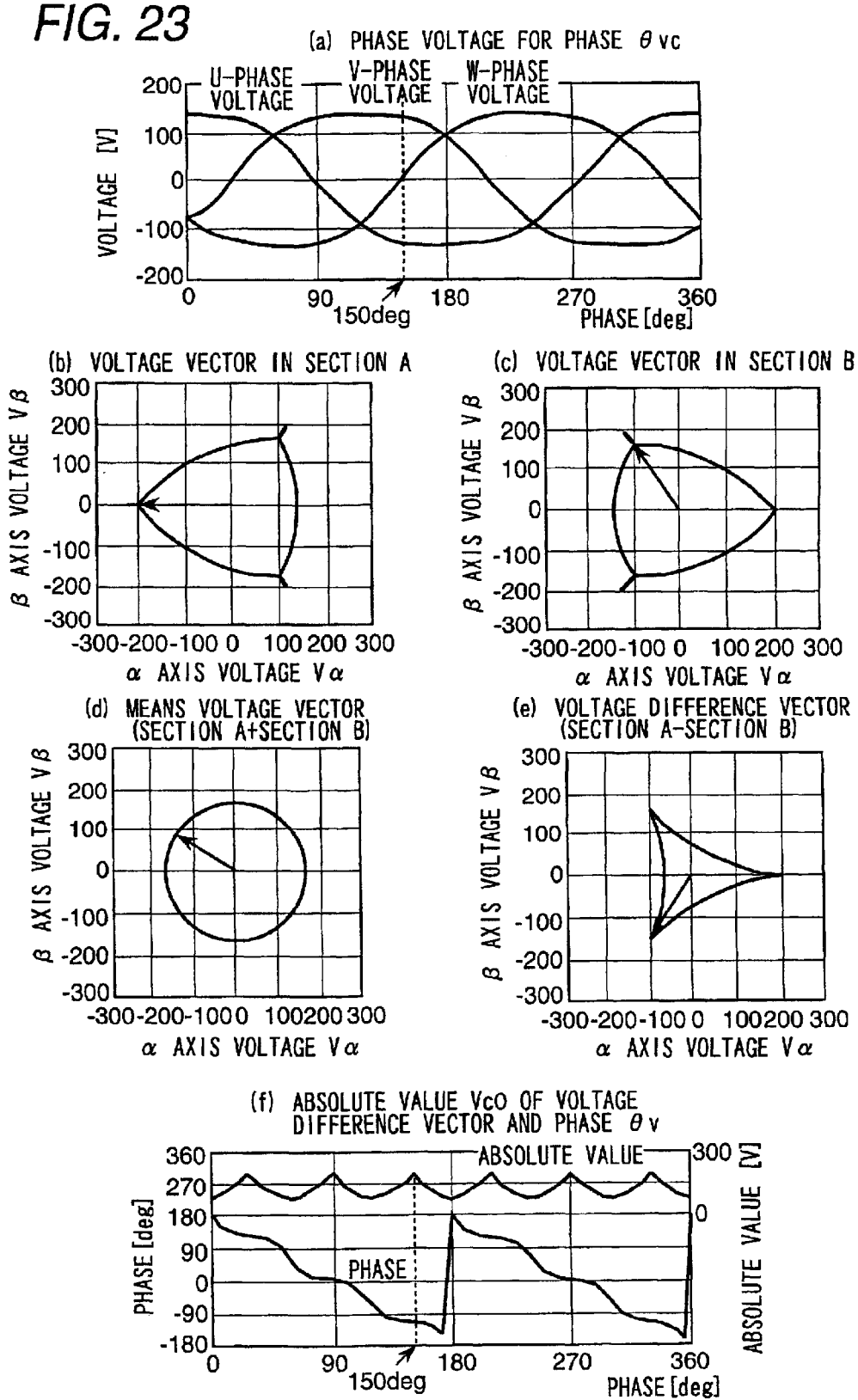
FIG. 23 is a time chart and Lissajous waveform diagram showing the relation between the sine wave voltage of each phase and the voltage difference vector in the fifth embodiment shown in FIG. 20.

When the speed ω of the synchronous motor 1 further increases and reaches the high-speed rotation state mode MD=3, the voltage setting unit 25 selects the calculation by the third voltage calculation unit 31. In this case, the table for performing the voltage calculation of each phase is prepared on the basis of FIG. 23(a) and (f). As FIG. 23 shows, when the phase of the 0-phase voltage of the third harmonic wave is reversed 180 degrees, the maximum value of the voltage of each phase is reduced. By doing this, when the synchronous motor 1 rotates at high speed and the counter electromotive force increases, the voltage use rate of the inverter 3 can be improved. As shown in FIG. 24(f), there is a disadvantage that the absolute value of the voltage difference vector varies greatly, while there is an advantage that the voltage range for realizing stable control can be enlarged.

The fifth embodiment can precisely detect the rotor position within the wide range from the stop state to the high-speed rotation state of the synchronous motor 1 and execute rapid-response control.

Further, it is basically desirable for this method to together use polarity discrimination for judging the N pole or S pole.

With respect to the synchronous motor 1 of each embodiment mentioned above, the motor including the rotor having reverse saliency is explained. However, also to a synchronous motor or a reluctance motor having saliency, the present invention can be applied using the saliency. Further, also to an induction motor, the present invention can be applied by making the reluctance different between the magnetic flux direction and the perpendicular direction to it from the magnetic saturation characteristic by the magnetic flux.

Further, needless to say, in consideration of the effect by rotation of the rotor of the motor during the sampling time, the pole position may be calculated.

Pole position detection is not limited to the method for executing every one period or two periods of the carrier and a method for detecting the pole position every multi-period of the carrier using current changes and a method for detecting the pole position on the basis of current changes in units of a plurality of periods can be executed.

This control not only can be applied to a driving AC motor for an electric car or a hybrid car but also can be widely applied as a position sensorless control system of an AC motor.

The present invention can realize a rapid-response motor controller without using a pole position sensor for detecting the rotation position of a rotor.

What is claimed is:

1. A motor controller comprising an AC motor, a power converter for applying a voltage to said AC motor by a PWM signal generated by comparing a command value with a carrier, and a controller for detecting a rotor position of said AC motor and controlling said command value, wherein:
    said controller detects said rotor position on the basis of a difference between a real current differential vector and a reference current differential vector.

2. A motor controller comprising an AC motor, a power converter for applying a voltage to said AC motor by a PWM signal generated by comparing a voltage command value with a carrier, and a controller for detecting a rotor position of said AC motor and controlling said voltage command value, wherein:
    said controller has a first phase current detection unit for detecting respective current differentials changed by respective voltage vectors applied in a plurality of sections, a reference phase current differential calculation unit for calculating reference phase current differentials obtained by a plurality of voltage vector differences, and a position detection unit for detecting said rotor position of said AC motor using said current differentials and said reference phase current differentials.

3. A motor controller according to claim 2, wherein said first phase current detection unit has a function for removing a DC component.

4. A motor controller according to claim 2, wherein said controller has a second phase current detection unit for detecting phase currents of two phases unlike said first phase current detection unit.

5. A motor controller according to claim 4, wherein said controller has an error detection unit for detecting an error in said phase current detection units on the basis of AC components of said phase currents detected by said first and second phase current detection units.

6. A motor controller comprising an AC motor, a power converter for applying a voltage to said AC motor by a PWM signal generated by comparing a voltage command value with a carrier, and a controller for detecting a rotor position of said AC motor and controlling said voltage command value, wherein:
    said controller has a current detection unit for detecting respective current differential vectors changed by respective voltage vectors applied in a plurality of sections, a reference current differential vector calculation unit for calculating reference current differential vectors obtained by said plurality of voltage vector differences, and a position detection unit for detecting said rotor position of said AC motor using differences between said current differential vectors and said reference current differential vectors.

7. A motor controller according to claim 6, wherein said current detection unit detects currents at a plurality of points of time when said carrier reaches close to a center value and obtains said current differential vectors on the basis of said plurality of currents.

8. A motor controller according to claim 7, wherein said controller has a detection phase changing unit for changing a detection phase by adding a zero-phase voltage to said voltage.

9. A motor controller according to claim 6, wherein in said controller, a detection phase decision unit for calculating a detection phase decided by said voltage and said detected rotor position has a position detection unit for detecting said rotor position using detection phase components of said differences of said current differential vectors and detection phase components of said reference current differential vectors.

10. A motor controller according to claim 9, wherein said controller has a detection phase changing unit for changing said detection phase by adding a zero-phase voltage to said voltage.

11. A motor controller according to claim 6, wherein said controller switches current detection timing according to a motor speed.

12. A motor controller comprising an AC motor, a power converter for applying a voltage to said AC motor by a PWM signal generated by comparing a voltage command value with a carrier, and a controller for detecting a rotor position of said AC motor and controlling said voltage command value, wherein:
    said controller has a current detection unit for detecting a current of said AC motor at a point of time when said carrier reaches close to a center value and a position detection unit for detecting said rotor position of said AC motor using said detected current.

13. A motor controller according to claim 12, wherein said controller has a detection phase decision unit for calculating a detection phase decided by said voltage and said detected rotor position and a position detection unit for detecting said rotor position using a detection phase component of a current vector.

14. A motor controller according to claim 13, wherein said controller has a detection phase changing unit for changing said detection phase by adding a zero-phase voltage to said voltage.

15. A motor controller comprising an AC motor, a power converter for applying a voltage to said AC motor by a PWM signal generated by comparing a voltage command value with a carrier, and a controller for detecting a rotor position of said AC motor and controlling said voltage command value, wherein:

said controller has a current detection unit for detecting a current of said AC motor in synchronization with said carrier, a detection phase decision unit for calculating a detection position decided by said voltage and said detected rotor position, and a position detection unit for detecting said rotor position by using a component of said detection phase of a current vector; and wherein said controller has a detection phase changing unit for changing said detection phase by adding a zero-phase voltage to said voltage.

16. A motor controller comprising an AC motor, a power converter for applying a voltage to said AC motor by a PWM signal generated by comparing a voltage command value with a carrier, and a controller for detecting a rotor position of said AC motor and controlling said voltage command value, wherein:

said controller has a current detection unit for detecting a current of said AC motor in synchronization with said carrier, a detection phase decision unit for calculating a detection position decided by said voltage and said detected rotor position, and a position detection unit for detecting said rotor position by using a component of said detection phase of a current vector; and wherein said controller switches current detection timing according to a motor speed.

17. A motor controller according to claim 16, wherein said current detection timing is a point of time when said carrier reaches a maximum value or a minimum value when said motor speed is low and a point of time when said carrier reaches close to a center value when said motor speed is high.

18. A motor controller comprising an AC motor, a power converter for applying a voltage to said AC motor by a PWM signal generated by comparing a command value with a carrier, and a controller for detecting a rotor position of said AC motor and controlling said command value, wherein:

said controller has a calculation unit for deciding a detection voltage to be added to said command value on the basis of said detected rotor position and deciding a reference current variation which is a standard for current changes, a first phase current detection unit for detecting a current variation for said detection voltage, and a position detection unit for detecting said rotor position of said AC motor on the basis of said reference current variation and said current variation.

19. A motor controller comprising an AC motor, a power converter for applying a voltage to said AC motor by a PWM signal generated by comparing a voltage command value with a carrier, and a controller for detecting a rotor position of said AC motor and controlling said voltage command value, wherein:

said controller has a current detection unit for detecting a current of said AC motor in synchronization with said carrier, a detection phase decision unit for calculating a detection position decided by said voltage and said detected rotor position, and a position detection unit for detecting said rotor position by using a component of said detection phase of a current vector;

wherein said current detection unit detects a current at a point of time when said carrier reaches close to a center value; and wherein said controller has a detection phase changing unit for changing said detection phase by adding a zero-phase voltage to said voltage.

* * * * *